United States Patent
Kim et al.

(10) Patent No.: US 8,270,353 B2
(45) Date of Patent: Sep. 18, 2012

(54) METHOD AND APPARATUS FOR LOAD BALANCING IN BROADBAND COMMUNICATION SYSTEM

(75) Inventors: Ki-Back Kim, Seongnam-si (KR);
Jae-Jeong Shim, Seongnam-si (KR);
Geun-Hwi Lim, Seongnam-si (KR);
Chang-Yeon Kim, Suwon-si (KR);
Yoon-Jeong Ha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 12/229,926

(22) Filed: Aug. 28, 2008

(65) Prior Publication Data

US 2009/0059857 A1  Mar. 5, 2009

(30) Foreign Application Priority Data

Aug. 29, 2007  (KR) .................. 10-2007-0087193
Jun. 10, 2008  (KR) .................. 10-2008-0054044
Jul. 8, 2008   (KR) .................. 10-2008-0065813

(51) Int. Cl.
*H04W 4/00* (2009.01)

(52) U.S. Cl. .................................................. 370/329

(58) Field of Classification Search .................. None
See application file for complete search history.

(56) References Cited

U.S. PATENT DOCUMENTS

| | | | |
|---|---|---|---|
| 7,570,618 B2 | 8/2009 | Son et al. | |
| 7,623,864 B2 | 11/2009 | Kang et al. | |
| 7,920,868 B2 | 4/2011 | Lim et al. | |
| 2003/0179731 A1 | 9/2003 | Noguchi et al. | |
| 2005/0101328 A1* | 5/2005 | Son et al. | 455/436 |
| 2005/0197133 A1* | 9/2005 | Hong et al. | 455/450 |
| 2005/0250498 A1* | 11/2005 | Lim et al. | 455/436 |
| 2007/0082621 A1* | 4/2007 | Lee et al. | 455/69 |
| 2007/0105558 A1* | 5/2007 | Suh et al. | 455/436 |
| 2008/0151821 A1* | 6/2008 | Cho et al. | 370/329 |
| 2008/0304449 A1* | 12/2008 | Sung | 370/329 |

FOREIGN PATENT DOCUMENTS

| | | |
|---|---|---|
| JP | 2003348007 A | 12/2003 |
| JP | 2007509527 T | 4/2007 |
| JP | 2007527176 T | 9/2007 |
| JP | 2007536784 T | 12/2007 |
| KR | 10-0733511 | 6/2007 |
| WO | WO 2005/086377 A1 | 9/2005 |
| WO | WO 2005/109689 A1 | 11/2005 |
| WO | WO 2007/078102 A1 | 7/2007 |

OTHER PUBLICATIONS

IEEE 802.16e-2005 and 802.16-2004/Cor1-2005, Feb. 28, 2006 (only a relevant part (p. 53) is provided).*
Partial European Search Report dated Apr. 4, 2011 in connection with European Patent Application No. 08 16 3186.

(Continued)

*Primary Examiner* — Yong Zhou

(57) ABSTRACT

An apparatus and method are provided for load balancing in a broadband communication system. In an initial network entry/network reentry/handover, whether to allow a user terminal and whether to allow each service flow are checked. The channel state and load state of candidate frequency assignments and subcells are detected. The ranging status of a corresponding frequency assignment or a corresponding subcell is set according to whether to allow the user terminal. The allowable candidate frequency assignment and subcells are selected and transmitted.

44 Claims, 11 Drawing Sheets

OTHER PUBLICATIONS

"IEEE Standard for Local and metropolitan area netwroks, Part 16: Air Interface for Fixed Broadband Wireless Access Systems", IEEE Std 802.16, Oct. 1, 2004, 894 pages.

Extended European Search Report dated Jun. 9, 2011 in connection with European Patent Application No. 08 16 3186.

Lee, et al. "A Novel Inter-FA Handover Scheme for Load Balancing in IEEE 802.16e System", IEEE, 2007, pp. 763-767.

802.16TM IEEE Standard for Local and Metropolitan Area Networks, "Part 16: Air Interface for Fixed Broadband Wireless Access Systems", IEEE Computer Society and IEEE Microwave Theory and Techniques Society, Oct. 1, 2004, 856 pages.

\* cited by examiner

METHOD AND APPARATUS FOR LOAD BALANCING IN BROADBAND COMMUNICATION SYSTEM

CROSS-REFERENCE TO RELATED APPLICATION(S) AND CLAIM OF PRIORITY

This application claims priority under 35 U.S.C. §119 to an application filed in the Korean Intellectual Property Office on Aug. 29, 2007 and assigned Serial No. 2007-87193, an application filed in the Korean Intellectual Property Office on Jun. 10, 2008 and assigned Serial No. 2008-54044 and an application filed in the Korean Intellectual Property Office on Jul. 8, 2008 and assigned Serial No. 2008-65813, the contents of which are incorporated herein by reference.

TECHNICAL FIELD OF THE INVENTION

The present invention relates generally to a method and apparatus for load balancing in a broadband communication system and, in particular, to a method and apparatus for performing load balancing in a broadband communication system in a network entry/re-entry/handover by using a ranging process.

BACKGROUND OF THE INVENTION

Since required capacity and allocated radio resources are constant for respective connections, conventional circuit switched communication networks such as CDMA (Code Division Multiple Access) or GSM (Global System for Mobile) have only to detect the number of subscribers in order to perform load balancing. Hereinafter, one connection is referred to as a service flow (SF).

FIG. 1 is a flow diagram illustrating a conventional connection admission control (CAC) flow for a new service flow generation request. If an already allowed QoS (Quality of Service) service flow is to change QoS requirements, the CAC flow may be performed from step 104 omitting steps 100 and 102.

Referring to FIG. 1, in step 100, a base station receives a call connection request from a user terminal.

In step 102, the base station compares the already allowed service flow number NCID with the maximum available service flow number $N_{MAX\_CID}$. If the $N_{MAX\_CID}$ is smaller than or equal to the $N_{CID}$, the flow proceeds to step 110. The base station rejects the call connection request in step 110. If the $N_{MAX\_CID}$ is greater than the $N_{CID}$, the flow proceeds to step 104. In step 104, the base station checks whether the call is a QoS call. If a QoS call, the flow proceeds to a corresponding mode. If not a QoS call, the flow proceeds to step 106. In step 106, the base station sets a BE (Best Effort) service. In step 108, the base station accepts the call connection request. According to embodiments, step 102 may be subdivided into detailed steps as follows. First, the number of service flows allowable by the base station or the subcell is checked, and if allowed, the number of service flows allowable for a corresponding user terminal is detected with respect to each of uplink and downlink or the total sum of the downlink and the uplink are detected.

However, in the third-generation wireless networks such as WiMAX or 3GPP2, a single base station must simultaneously support multimedia applications having various traffic characteristics (e.g., real time vs. non real time, and constant bit rate (CBR) vs. variable bit rate (VBR)) and high-grade access techniques (e.g., AMC, HARQ, PF scheduling, and MIMO) are differentially applied depending on the traffic characteristics, thus making it difficult to perform load balancing by checking only the subscriber number and the connection number. Due to such various traffic characteristics, for connection admission control, the bandwidth requirement capacity for each connection must be checked for each traffic type, and the process requirement time for each connection must be differentially scheduled by a scheduler.

In relation to load balancing in a broadband communication system, the current IEEE 802.16 standards are as follows.

First, according to the IEEE 802.16 standard, if a serving FA (frequency assignment) cannot support a corresponding user terminal in an initial network entry, network reentry, quick connection step (QCS) and handover after a ranging request (RNG-REQ), a corresponding FA is aborted and another FA (four (4) bytes, in units of KHz) is overridden to report the same to a corresponding user terminal through a ranging response (RNG-RSP).

Second, a base station notifies a subcell identifier BSID in the case of BSHO-REQ (BS HO REQuest), MSHO-REQ (MS HO REQuest), BSHO-RSP (BS HO ReSPonse), SCN-REQ (SCaNning interval allocation REQuest), or SCN-RSP (SCaNning interval allocation ReSPonse), and notifies an FA in the case of RNG-RSP. The BSID and the subcell are mapped in one-to-one correspondence (1 subcell=1FA/1 sector). Thus, if multiple FAs are used for one sector, as many BSIDs as the FAs are used for one sector. On the contrary, if three sectors are allocated to one FA, three BSIDs are used for a corresponding FA.

Third, through the RNG-RSP (BSHO-REQ and BSHO-RSP), the CAC results are provided by service level prediction (SLP). That is, the SLP value specifies a service level that can be expected by a user terminal from a base station. For example, if the SLP is 0, it means that no service is possible for a user terminal. If the SLP is 1, it means that some service is available for one or several service flows authorized for a user terminal. If the SLP is 2, it means that for each authorized service flow, a MAC connection can be established with QoS specified by the AuthorizedQoSParamSet. If the SLP is 3, it means that no service level prediction is available.

However, the current IEEE 802.16 standard has the following problems in relation to load balancing.

First, the standard fails to specify how to make a load check by a base station in a ranging request, how to select an FA to be overridden in a ranging response if a serving subcell cannot support a corresponding user terminal, how to process an overridden FA by a user terminal in a ranging response, and how to perform a communication process between the system and the user terminal after the ranging response, failing to provide a complete load balancing scheme. For example, a user terminal may first perform an initial network entry process for an FA not selected by a base station based on the radio environment estimated by the user terminal itself. In this case, because the base station selects another FA by load balancing, this process may be repeated. As another example, a FA is notified in overriding but a user terminal is uncertain of which subcell it is to select, because one FA may have multiple subcells.

Second, downlink radio conditions of FAs in the same sector are similar but that of FAs in different sectors may be greatly different. In this case, if a base station considers only load balancing without considering radio conditions, because a user terminal will attempt a handover to the side with good radio conditions, the base station and the user terminal are different in requirements, which may cause a ping-pong phenomenon.

Third, load balancing processes considered in an initial network entry, network reentry and handover are controlled through a ranging process, but they must consider the following difference. In the case of an initial network entry, because there is no information about a service flow in a ranging process, only the user number is checked. In the case of a network reentry/handover, because not only the user number but also information about a service flow can be checked in a ranging process, it is necessary to additionally consider the service flow number and the bandwidth (BW) of each service flow as well as the user number. In view of service continuity, because a service does not start in an initial access and re-access, it is preferable to induce a reentry in an initial network entry or network reentry for load balancing. Also, it is preferable to induce a handover in load balancing for a seamless service because a service is being provided in a handover.

Fourth, there may be a case where the subscriber number limit is not exceeded in the network reentry/handover and there is no candidate subcell that can allow all the service flows of the corresponding user terminal. What is therefore required is a scheme for providing against the case where some service flows are allowed but the remaining service flows are not allowed.

SUMMARY OF THE INVENTION

To address the above-discussed deficiencies of the prior art, it is a primary object of the present invention to substantially solve at least the above problems and/or disadvantages and to provide at least the advantages set forth below. Accordingly, an object of the present invention is to provide a method and apparatus for performing load balancing in a broadband communication system in a ranging process.

According to an aspect of the present invention, a method for performing load balancing in a broadband communication system in an initial network entry includes: determining, upon receipt of a ranging request, whether to allow a user terminal through a user admission control; detecting the channel state and load state of a candidate Frequency Assignment (FA) and subcells if the user terminal is not allowed; and setting a ranging state of a corresponding FA or a corresponding subcell according to whether to allow the user terminal and selecting the available candidate FA and subcells prior to transmission.

According to another aspect of the present invention, a method for performing load balancing in a broadband communication system in an initial network entry includes: determining, upon receipt of a ranging request, whether to allow a user terminal through a user admission control; if the user terminal is not allowed, when a base station-initiated handover flag (BS_init HO flag) is set by operator in advance for a network entry, allowing the user terminal, and completing a network entry; and performing a handover process to one of available subcells upon completion of the network entry.

According to still another aspect of the present invention, a method for performing load balancing in a broadband communication system in a network reentry/handover includes: performing, upon receipt of a ranging request, an admission control for each flow with respect to an available user terminal to determine whether to allow service flows; detecting the channel state and load state of a candidate Assignment (FA) and subcells if all the service flows of the user terminal are not allowed; and setting a ranging state of a corresponding FA or a corresponding subcell according to whether to allow the service flows and selecting the available candidate FA and subcells prior to transmission.

According to still another aspect of the present invention, a method for performing load balancing in a broadband communication system in a network reentry/handover includes: performing, upon receipt of a ranging request, an admission control for each flow with respect to an available user terminal to determine whether to allow service flows; if all the service flows of the user terminal are not allowed, when a base station-initiated handover flag (BS_init Handover flag) is set by operator for a network reentry/handover in advance and transmitting a ranging response message; and if the base station-initiated handover flag is set, performing a base station-initiated handover (BS_init HO) process.

According to still another aspect of the present invention, an apparatus for performing load balancing in a broadband communication system in an initial network entry includes: a subscriber limiter for determining, upon receipt of a ranging request, whether to allow a user terminal through a user admission control; a controller for detecting the channel state and load state of a candidate Frequency Assignment (FA) and subcells if the user terminal is not allowed; and a load balancing controller for setting a ranging state of a corresponding FA or a corresponding subcell according to whether to allow the user terminal and selecting the available candidate FA and subcells prior to transmission.

According to still another aspect of the present invention, an apparatus for performing load balancing in a broadband communication system in an initial network entry includes: a subscriber limiter for determining, upon receipt of a ranging request, whether to allow a user terminal through a user admission control; and a controller for setting, if the user terminal is not allowed, when a base station-initiated handover flag (BS_init HO flag) is set by operator for the initial network entry in advance, allows the user terminal to complete a network entry, and to perform a handover process to one of available subcells upon completion of the network entry.

According to still another aspect of the present invention, an apparatus for performing load balancing in a broadband communication system in a network reentry/handover includes: a connection admission controller for performing, upon receipt of a ranging request, an admission control for each flow with respect to an available user terminal to determine whether to allow service flows; a load balancing controller for detecting the channel state and load state of a candidate Frequency Assignment (FA) and subcells if all the service flows of the user terminal are not allowed; and a controller for setting a ranging state of a corresponding FA or a corresponding subcell according to whether to allow the service flows and selecting the available candidate FA and subcells prior to transmission.

According to still another aspect of the present invention, an apparatus for performing load balancing in a broadband communication system in a network reentry/handover includes: a connection admission controller for performing, upon receipt of a ranging request, an admission control for each flow with respect to an available user terminal to determine whether to allow service flows; and if all the service flows of the user terminal are not allowed, transmitting a ranging response message, and performing a base station-initiated handover (BS_init HO) process if the base station-initiated handover flag is set.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 10B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged broadband communication system.

The present invention is intended to provide a method and apparatus for distributing, by a base station, radio resources to multiple user terminals in one or more subcells (1FA/1sector) in a broadband communication system in a balanced manner.

Figure 1:
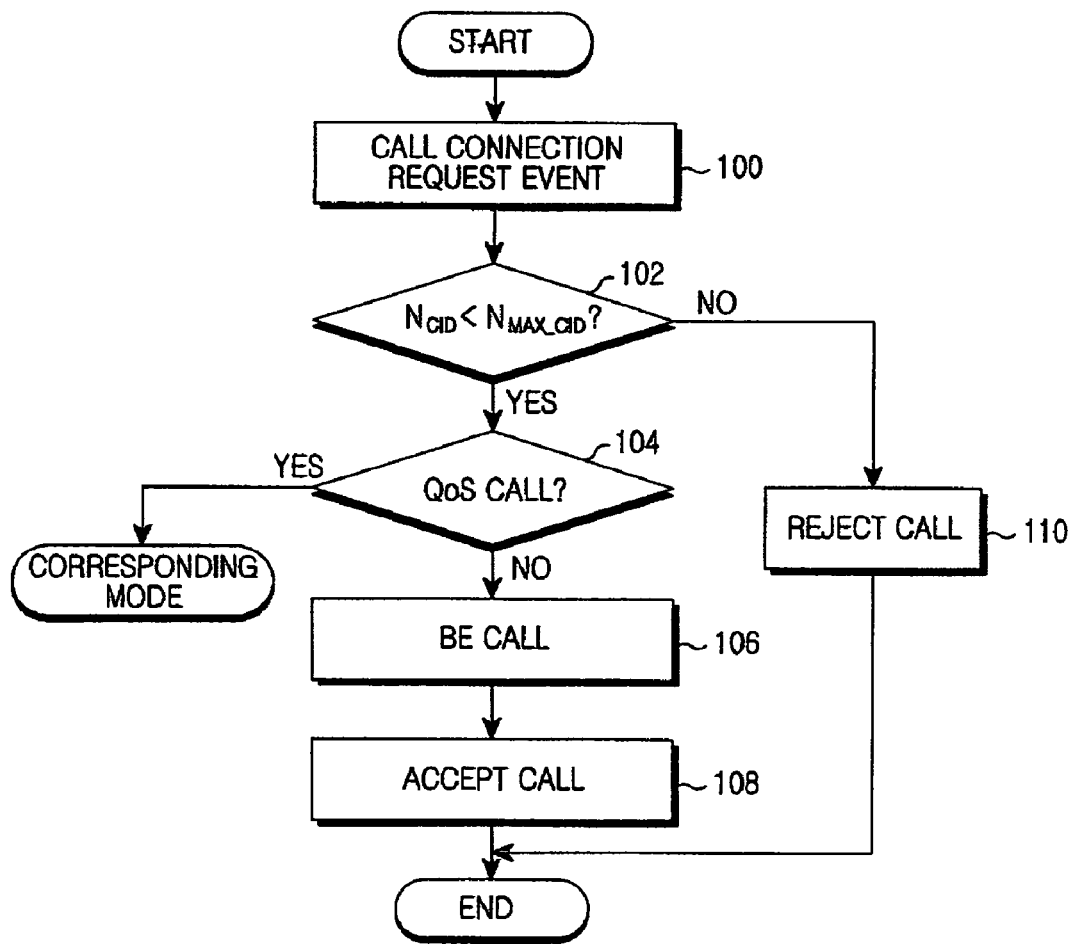
FIG. 1 is a flow diagram illustrating a conventional CAC flow.
Figure 2:
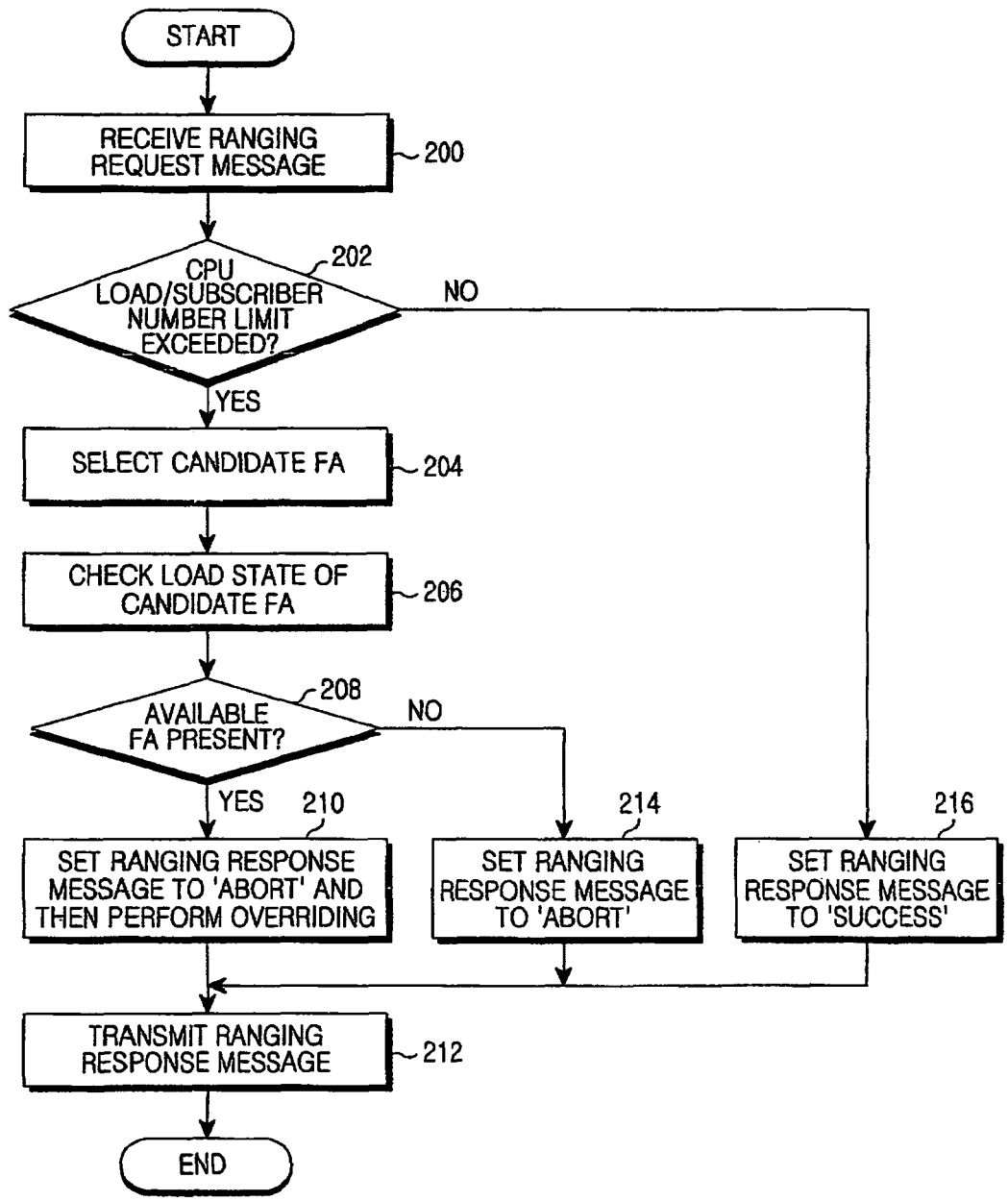
FIG. 2 is a flow diagram illustrating an operation of a base station for performing load balancing in a broadband communication system in an initial network entry without the use of channel state information according to an embodiment of the present invention.

FIG. 2 is a flow diagram illustrating an operation of a base station for performing load balancing in a broadband communication system in an initial network entry without the use of channel state information according to an embodiment of the present invention.

Referring to FIG. 2, in step 200, a base station receives a ranging request message from a user terminal in an initial network entry.

In step 202, in response to the ranging request, the base station checks available radio resources, a CPU load, and the maximum allowable subscriber number to check whether the CPU load/subscriber number limit is exceeded. Herein, the excess or not of the maximum allowable downlink/uplink SF number for each subscriber class per Access Service Network Gateway (ASN_GW), per base station (BS), per subcell, or per subscriber may also be a subscriber number limit check item. For example, the IEEE 802.16 standard specifies the maximum allowable awake/sleep user number limit per subcell and also the idle mode user number limit and the active (awake+sleep) mode user number limit per ASN_GW. For the subscriber number limit depending on a CPU load, the CPU load may be classified into five levels of 'over load', 'heavy load', 'normal load', 'light load' and 'no load', and the allowable additional subscriber numbers for the respective CPU load levels may be respectively set to 0%, 10%, 50%, 70% and 100% of the maximum allowance.

If the CPU load/subscriber number limit for a ranging process is not exceeded (in step 202), the operation proceeds to step 216. In step 216, the base station sets a ranging state to 'success'. If an initial ranging code is received within a tolerable range, the base station sets the ranging state to 'success'.

On the other hand, if the CPU load/subscriber number limit for the ranging process is exceeded (in step 202), the operation proceeds to step 204. In step 204, the base station selects candidate FAs (or subcells). Herein, for the selection of the candidate FAs (or subcells), FAs (or subcells) in the same sector are first selected and then FAs (or subcells) of other sectors or neighbor cells contained in a Neighbor Advertisement (MBR-ADV) message are selected if there is no allowance in the same sector.

If the user terminal is in the condition of a handover, the load balancing may be performed by selecting FAs (or subcells) in the same sector and selecting FAs (or subcells) of other sectors if FAs (or subcells) in the same sector are not allowed. However, if the user terminal is not in the condition of a handover (i.e., if the mobility of the user terminal is small) and if FAs (or subcells) in the same sector are not allowed, performing the load balancing by selection of FAs (or subcells) of other sectors may actually degrade the performance. The reason for this is that FAs (or subcells) of other sectors may be worse in radio channel state than FAs (or subcells) of the same sector, when the user terminal is not in the condition of a handover, although the FAs (or subcells) of other sectors are allowable. Thus, in this case, load balancing may be performed partially in the same sector, although all the FAs (or subcells) of the same sector are not allowed.

In step 206, the base station checks the load state of the selected candidate FA (or subcell). Herein, the load state of the candidate FA (or subcell) may be checked by periodically receiving information about the load state of the candidate FA (or subcell) from neighbor base stations (i.e., in a pull mode), or by timely requesting/receiving information about the load state of the candidate FA (or subcell) from neighbor base station (i.e., in a push mode).

In step 208, in consideration of the load state, the base station checks whether there is an available candidate FA (or subcell). If there is no available candidate FA (or subcell) (in step 208), the operation proceeds to step 214. In step 214, the base station sets the ranging state to 'abort' without overriding. On the other hand, if there is an available candidate FA (or subcell) (in step 208), the operation proceeds to step 210. In step 210, the base station sets the ranging state to 'abort' and overrides the available FA (or subcell). If a subcell that received a ranging request cannot support a corresponding user terminal, because the corresponding user terminal is in a null state failing an initial access, the corresponding user terminal may attempt an initial access to an FA or a subcell present in a ranging response message (if there are multiple available FAs or subcells, by selecting one of them) or may attempt an initial access by randomly selecting subcells present in a NeighBoR ADVertisement (NBR-ADV) message.

In step 212, the base station generates a ranging response message containing information about the ranging state and the available FA (or subcell ID) and transmits the ranging response message to the user terminal. Herein, if 'abort' is set in the ranging response message and another available FA is notified, an SLP value may be specified about another available FA (or subcell) as well as the subcell that received the ranging message and whether there is the same sector may also be notified. In the current standard, a TLV (Type/Length/Value) structure of a ranging message is configured to allow only one FA. However, the present invention proposes that multiple FAs or one or more subcell IDs (BSIDs) can be included in 'frequency override' TLV of the ranging response message. The handover operation mode is useful when a target subcell or a FA is present in the same sector or radio conditions are similar.

In still another case, if the ranging sate is 'abort' and there is no available FA (or subcell ID), the corresponding user terminal may perform a network entry process. Also, if the ranging state is 'success', the base station and the user terminal maintain and use a current serving FA or subcell ID.

As described above, only FA information can be notified through the ranging response message. However, according to another embodiment, a preamble index of the target BS is also transmitted along with FA through the ranging response message, in order to easily search to which subcell the user terminal corresponds. Also, it is fundamental that scanning about candidate FAs present in the same sector is not performed, and, although present in different sectors, other available FAs (together with a preamble index) or subcells are transmitted without additional scanning and one of available subcells is selected to perform a load balancing control. However, if scanning is performed in advance, because not all the subcells in a neighbor base station list of the NBR-ADV message but only the best few FAs or subcells can be transmitted through the ranging response message, the size of the ranging response message can be reduced.

Thereafter, the load balancing process of the present invention is ended.

In the case of FIG. 2, because the base station performs the load balancing process considering only the load state without considering the channel state, if the channel state of the low-load FA or subcell is ill-conditioned, the user terminal will re-attempt a network entry to another FA or subcell.

Figure 3A:
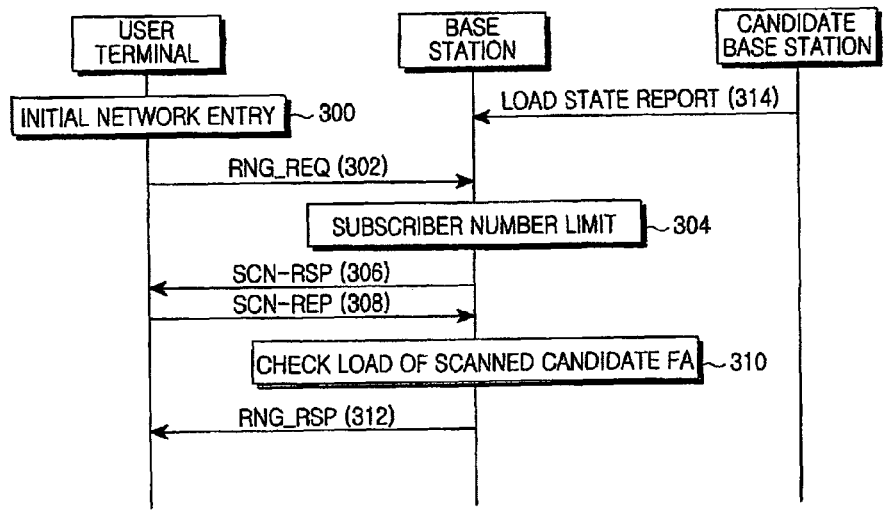
FIGS. 3A and 3B are a flow diagram illustrating a signal flow for performing load balancing in a broadband communication system in an initial network entry by the use of channel state information according to an embodiment of the present invention.

FIG. 3A is a flow diagram illustrating a signal flow for performing load balancing in a broadband communication system in an initial network entry by the use of channel state information according to an embodiment of the present invention.

Referring to FIG. 3A, in step 302, a user terminal transmits a ranging request message to a base station for an initial network entry (300).

In step 304, in response to the ranging request, the base station checks whether the overload (CPU or memory)/subscriber number limit is exceeded. If the subscriber number limit is exceeded, the base station selects a candidate FA or subcell.

In step 306, the base station transmits a scanning response (SCN_RSP) to the user terminal in a scanning period to request scanning.

In step 308, the user terminal reports the scanning results to the candidate subcell through a scanning report (SCN_REP) message during the scanning period.

In step 310, using the reported scanning results, the base station selects a subcell with a channel state, which does not cause ping-pong to take place by handover and load balancing, and checks the load state of the selected subcell. Herein, the load state may be detected by periodically receiving the load state from candidate base stations, as in step 314. In another embodiment, the load state may be checked by requesting/receiving the load state from a candidate base station in a timely manner (e.g., if it is necessary to check the load state of a subcell satisfying the channel state after the scanning report) (not illustrated in FIG. 3A).

In step 312, the base station determines a target subcell in consideration of the load state of the candidate subcell and notifies the same to the user terminal through a ranging response message. Thus, by considering the channel state and the load state of the candidate subcell, the user terminal and the base station can avoid a ping-pong phenomenon between candidate FAs or subcells due to handover or load balancing.

Herein, information notified through the ranging response message to the user terminal according to the load check or channel state results includes one of 'a list of all the available FAs or subcell IDs', 'a list of available FAs or subcell IDs sorted from the lowest-load one', 'a list of available FAs or subcell IDs sorted by channel state', 'an FA or subcell ID with the best radio network among available FAs or subcell IDs', 'an FA or subcell ID with the lowest load among available FAs or subcell IDs', 'a list of available FAs or subcell IDs sorted from the best one by giving different importance to load and radio network', and 'an FA or subcell ID among available FAs or subcell IDs by applying different weight to load and channel state'.

Thereafter, the load balancing process of the present invention is ended.

Figure 3B:
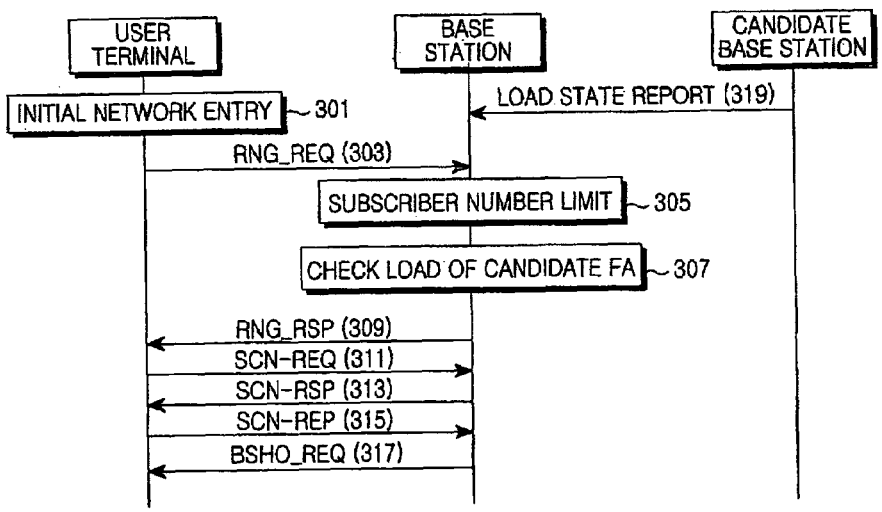

FIG. 3B is a flow diagram illustrating a signal flow for performing load balancing in a broadband communication system in an initial network entry by the use of channel state information according to another embodiment of the present invention.

Referring to FIG. 3B, in step 303, a user terminal transmits a ranging request message to a base station for an initial network entry (301).

In step 305, in response to the ranging request, the base station checks whether the CPU load/subscriber number limit is exceeded. If the subscriber number limit is exceeded, the base station selects a candidate FA or subcell.

In step 307, the base station checks the load states of candidate subcells. Herein, the load state may be checked by periodically receiving the load state from candidate base stations, as in step 319. In another embodiment, the load state may be checked by requesting/receiving the load state from a candidate base station in a timely manner (e.g., if it is necessary to detect the load state of a subcell satisfying the channel state after the scanning report) (not illustrated in FIG. 3B).

In step 309, in consideration of the load states of the candidate subcells, the base station notifies available candidate subcells to the user terminal through a ranging response message.

In step 311, the user terminal transmits a scanning request (SCN_REQ) message to the base station.

In step 313, the base station transmits a scanning response message to the user terminal.

In step 315, through a scanning report (SCN_REP) message, the user terminal reports the scanning results for the candidate subcells whose load states are considered during the scanning period. According to another embodiment, if the BS_init_Ho flag is set, scanning process (from step 311 to step 315) may be omitted.

In step 317, after the ranging response, the base station separately transmits a base station handover request (BSHO-REQ) to forcibly perform a handover so that the user terminal can again perform an initial network entry, or a handover operation mode (mandatory or recommend) is added in the ranging response message so that the base station can initiate a handover (BS_init HO). After the ranging response, a step of transmitting a BSHO-REQ or adding a handover operation mode may be performed in FIG. 2 or FIG. 3A.

Thereafter, the load balancing process of the present invention is ended.

Figure 4:
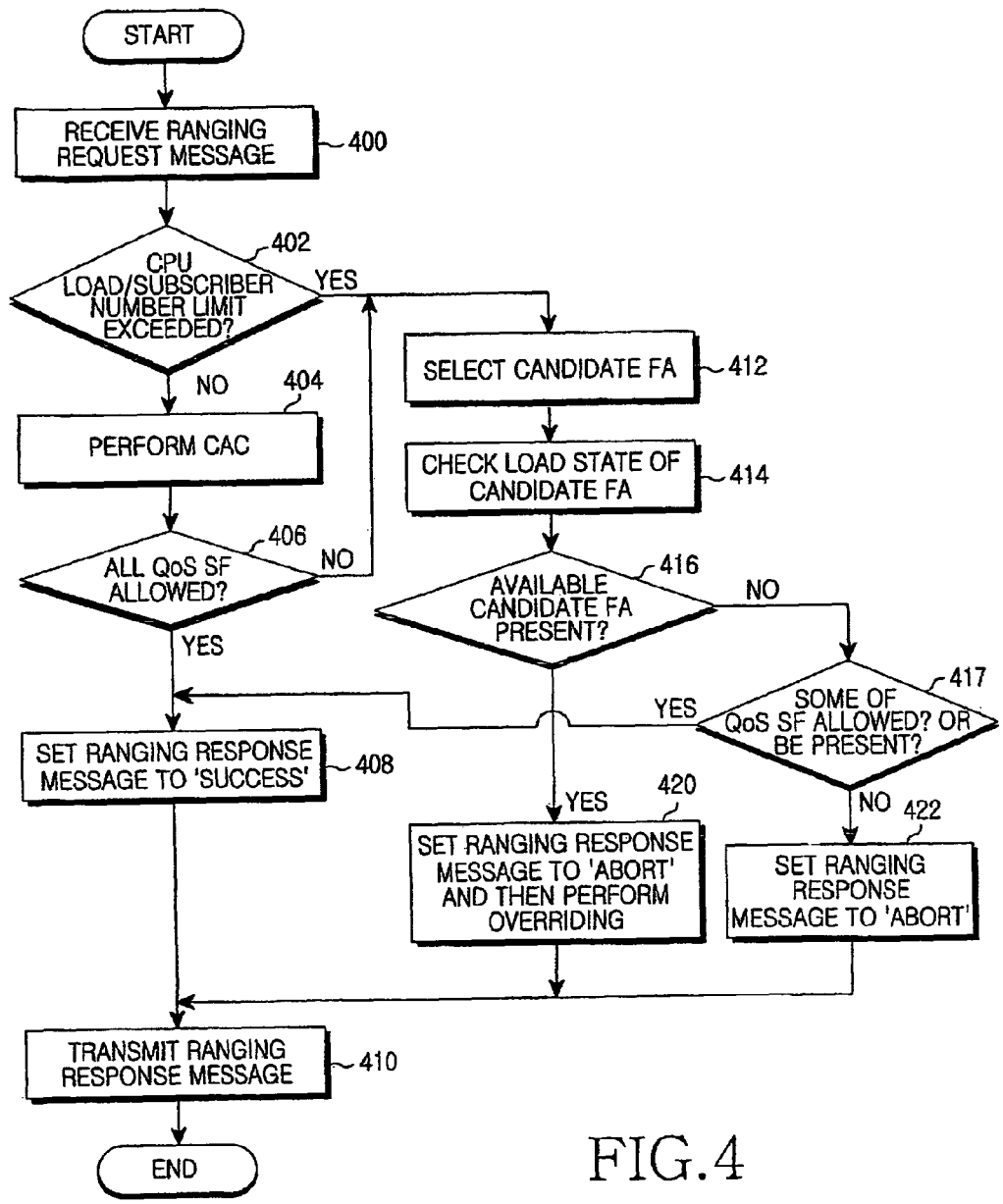
FIG. 4 is a flow diagram illustrating an operation of a base station for performing load balancing in a broadband communication system in a network reentry without the use of channel state information according to an embodiment of the present invention.

FIG. 4 is a flow diagram illustrating an operation of a base station for performing load balancing in a broadband communication system in a network re-entry without the use of channel state information according to an embodiment of the present invention.

Referring to FIG. 4, in step 400, a base station receives a ranging request message from a user terminal in a network reentry.

In step 402, in response to the ranging request, the base station checks the overload (CPU or memory)/subscriber number limit. Herein, the excess or not of the maximum allowable downlink/uplink SF number for each subscriber class per Access Service Network Gateway (ASN_GW), per base station (BS), per subcell, or per subscriber may also be a subscriber number limit check item. For example, the IEEE 802.16 standard specifies the maximum allowable awake/sleep user number limit per subcell and also the idle mode user number limit and the active (awake+sleep) mode user number limit per ASN_GW. For the subscriber number limit depending on a CPU load, the CPU load may be classified into five levels of 'over load', 'heavy load', 'normal load', 'light load' and 'no load', and the allowable additional subscriber numbers for the respective CPU load levels may be respectively set to 0%, 10%, 50%, 70% and 100% of the maximum allowance.

If the subscriber number limit for a ranging process is not exceeded (in step 402), the operation proceeds to step 404. In step 404, the base station performs a Connection Admission Control (CAC) for per-flow QoS. In step 406, the base station determines whether all QoS SFs are allowed. If all QoS SFs are allowed (in step 406), the operation proceeds to step 408. In step 408, the base station sets a ranging state to 'success'. On the other hand, if all QoS SFs are not allowed (in step 406), the operation proceeds to step 412.

On the other hand, if the subscriber number limit for the ranging process is exceeded (in step 402), the operation proceeds to step 412. In step 412, the base station selects candidate FAs (or subcells). Herein, for the selection of the candidate FAs (or subcells), FAs in the same sector are first selected and then FAs (or subcells) of other sectors or neighbor cells contained in a Neighbor Advertisement (MBR-ADV) message are selected if there is no allowance in the same sector.

If the user terminal is in the condition of a handover, the load balancing may be performed by selecting FAs (or subcells) in the same sector and selecting FAs (or subcells) of other sectors if FAs (or subcells) in the same sector are not allowed. However, if the user terminal is not in the condition of a handover (i.e., if the mobility of the user terminal is small) and if FAs (or subcells) in the same sector are not allowed, performing the load balancing by selection of FAs (or subcells) of other sectors may actually degrade the performance. The reason for this is that FAs (or subcells) of other sectors may be worse in radio channel state than FAs (or subcells) of the same sector, when the user terminal is not in the condition of a handover, although the FAs (or subcells) of other sectors are allowable. Thus, in this case, load balancing may be performed partially in the same sector, although all the FAs (or subcells) of the same sector are not allowed.

In step 414, the base station checks the load state of a candidate FA (or subcell). Herein, the load state of the candidate FA (or subcell) may be checked by periodically receiving information about the load state of the candidate FA (or subcell) (i.e., in a pull mode), or by timely requesting/receiving information about the load state of the candidate FA (or subcell) (i.e., in a push mode).

In step 416, in consideration of the load state, the base station checks whether there is an available candidate FA (or subcell).

If there is no available candidate FA (or subcell) (in step 416) and if only some of QoS SFs are allowed based on the bandwidth of a serving subcell, the ranging state may be set to 'success' or 'abort'.

First, a description will be given of a case whether the ranging state is set to 'success' if only some of QoS SFs are allowed based on the bandwidth of a serving subcell.

If there is no available candidate FA (or subcell) (in step 416) and if only some of QoS SFs are allowed in the CAC based on the bandwidth of a serving subcell or a BE is present (in step 417), the operation proceeds to step 408. In step 408, the base station sets 'success' in a ranging response message. In this case, an operation scheme of the system and the user terminal may be one of the following. First, all of Initial Service Flows (ISFs) are allowed and some of the remaining SFs are not allowed. Only the allowed SFs are allocated Traffic Categories ID (TCID) to be enabled. Among the non-allowed SFs, the SFs set to static QoS are stored/managed by the system and the user terminal without additional Dynamic Service Change (DSC), and the SFs set to dynamic QoS are released by the system and the user terminal without additional Dynamic Service Deletion (DSD). Alternatively, the non-allowed SFs are released in the system and the user terminal by not updating it in the ranging response message, and it is specified that some of SLP values are allowable (SLP=1 for the IEEE 802.16 standard). Second, the state stored by the system and the user terminal before transmission of the RNG-REQ message with respect to all of managed SFs is maintained as it is, a base station-initiated deregistration (BS_init DREG) message is immediately transmitted to make the user terminal an idle mode or BS_init BSHO-REQ is performed using all the BSIDs in a NBR-ADV message as candidate IDs. If the non-allowed SFs are ISFs, the second process is necessarily performed.

A description will now be given of a case whether the ranging state is set to 'abort' if only some of QoS SFs are not allowed based on the bandwidth of a serving subcell.

On the other hand, if there is no available candidate FA (or subcell) (in step 416) and if only some of QoS SFs are not allowed in the CAC based on the bandwidth of a serving subcell (in step 417), the operation proceeds to step 422. In step 422, the base station sets the ranging state to 'abort' without overriding.

If there is an available candidate FA (or subcell) (in step 416), the operation proceeds to step 420. In step 420, the base station sets the ranging state to 'abort' and overrides the available FA (or subcell).

In step 410, the base station transmits a ranging response message containing information about the ranging state and the available FA (or subcell ID). Herein, if 'abort' is set in the ranging response message and another available FA is notified, an SLP value may be specified about another available FA (or subcell) as well as the subcell that received the ranging message and whether there is the same sector may also be notified. In the current standard, a TLV (Type/Length/Value) structure of a ranging message is configured to allow only one FA. However, the present invention proposes that a subcell ID (BSID) can also be included therein.

As an example of the SLP technique, if there are different FAs allowing all the SFs in the same sector, the ranging state is set to 'abort' to notify the same, and it is specified that all the SLP values are allowable for different FAs (or subcell IDs) (SLP=2 for the IEEE 802.16 standard). Herein, it is not necessary to specify a SLP value for a serving subcell. If a serving subcell cannot allow all the SFs and if there is an FA (or subcell ID) capable of allowing some of the SFs in the same sector, the ranging state is set to 'abort' to notify the same, and it is specified that some of the SLP values are allowable for different FAs (or subcell IDs) (SLP=1 for the IEEE 802.16 standard). Herein, it is not necessary to specify a SLP value for the serving subcell. In this case, the user terminal interprets that its own serving subcells cannot be allowed at all. If SFs (or subcell IDs) in the same sector are not allowable at all and if different FAs or BSIDs in the same BS are allowable, the RNG-RSP is set to 'abort' to notify the same, and SLP values are specified for different FAs (or subcell IDs) (SLP=1 or 2 for the IEEE 802.16 standard). Herein, it is not necessary to specify a SLP value for a serving subcell. In this case, the user terminal knows that its own serving subcells cannot be allowed at all. If all the subcells in the same base station cannot allow QoS flows at all, the ranging state is set to 'abort' to notify the same, and SLP values are specified (SLP=0 for the IEEE 802.16 standard). The user terminal notifies this state to the user through its display window, so that the user notifies the overload of the corresponding base station at a specific time. Lastly, load detection is performed also on subcells of different base stations, not the same base station, to notify allowable FAs or subcell IDs (BSIDs) through the RNG-RSP.

For reference, after the ranging response, the base station separately transmits a BSHO-REQ to forcibly perform a handover so that the user terminal can again perform a network reentry or an initial network entry, or a handover operation mode (mandatory or recommend) is added in the ranging response message so that the base station can initiate a handover (BS_init H)). The handover operation mode is useful when a target subcell or a FA is present in the same sector or radio conditions are similar.

Thereafter, the load balancing process of the present invention is ended.

Figure 5A:
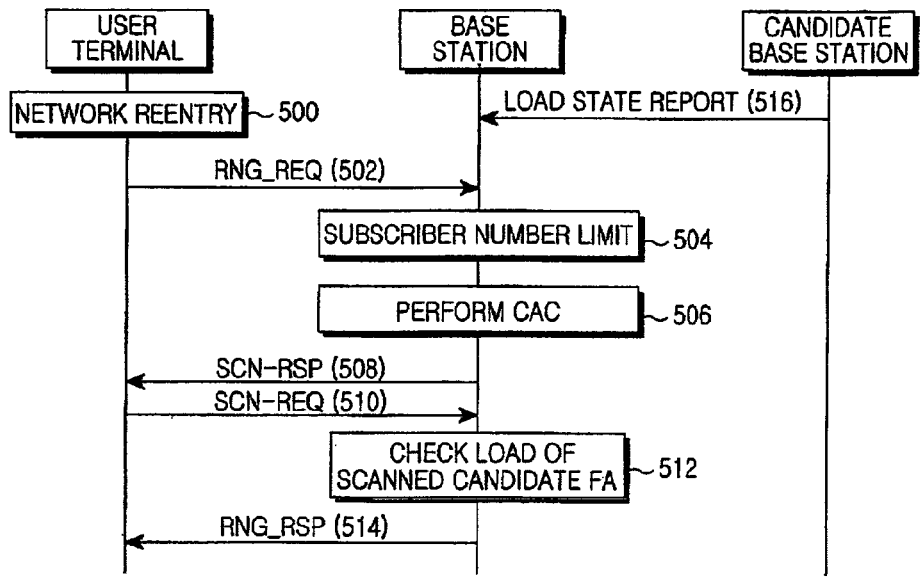
FIGS. 5A and 5B are a flow diagram illustrating a signal flow for performing load balancing in a broadband communication system in a network reentry by the use of channel state information according to an embodiment of the present invention; (510 should be SCN-REP)

FIG. 5A is a flow diagram illustrating a signal flow for performing load balancing in a broadband communication system in a network reentry by the use of channel state information according to an embodiment of the present invention.

Referring to FIG. 5A, in step 502, a user terminal transmits a ranging request message to a base station for a network reentry (500).

In step 504, in response to the ranging request, the base station checks whether the CPU load/subscriber number limit is exceeded.

If the CPU load/subscriber number limit is exceeded, the base station performs a Connection Admission Control (CAC) for per-flow QoS, in step 506.

In step 508, the base station transmits a scanning response (SCN_RSP) including information about all candidate subcells and a scanning period to the user terminal to request scanning.

In step 510, the user terminal reports the scanning results to the candidate subcell through a scanning report (SCN_REP) message during the scanning period.

In step 512, using the reported scanning results, the base station selects a subcell with a channel state, which does not cause ping-pong to take place generated by handover and load balancing, and checks the load state of the selected subcell. Herein, the load state may be checked by periodically receiving the load state from candidate base stations, as in step 516. In another embodiment, the load state may be checked by requesting/receiving the load state from a candidate base station in a timely manner (e.g., if it is necessary to detect the load state of a subcell satisfying the channel state after the scanning report) (not illustrated in FIG. 5A).

In step 514, the base station determines a target subcell in consideration of the load state of the candidate subcell and notifies the same to the user terminal through a ranging response message. Thus, by considering the channel state and the load state of the candidate subcell, the user terminal and the base station can avoid a ping-pong phenomenon between candidate FAs or subcells due to handover or load balancing.

Herein, information notified through the ranging response message to the user terminal according to the load check or channel state results includes one of 'a list of all the available FAs or subcell IDs', 'a list of available FAs or subcell IDs sorted from the lowest-load one', 'a list of available FAs or subcell IDs sorted by channel state', 'an FA or subcell ID with the best radio network among available FAs or subcell IDs', 'an FA or subcell ID with the lowest load among available FAs or subcell IDs', 'a list of available FAs or subcell IDs sorted from the best one by giving different importance to load and radio network', and 'an FA or subcell ID among available FAs or subcell IDs by applying different weight to load and channel state'.

Thereafter, the load balancing process of the present invention is ended.

Figure 5B:
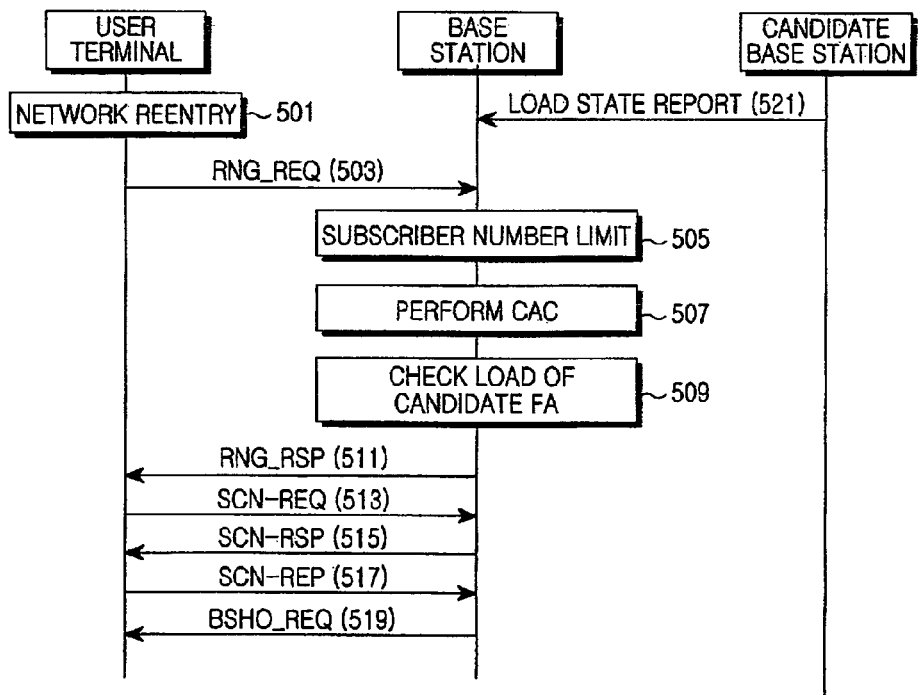

FIG. 5B is a flow diagram illustrating a signal flow for performing load balancing in a broadband communication system in a network reentry by the use of channel state information according to another embodiment of the present invention.

Referring to FIG. 5B, in step 503, a user terminal transmits a ranging request message to a base station for a network reentry (501).

In step 505, in response to the ranging request, the base station checks whether the CPU load/subscriber number limit is exceeded.

In step 507, the base station performs a Connection Admission Control (CAC) for per-flow QoS.

In step 509, the base station checks the load states of candidate subcells. Herein, the load state may be checked by periodically receiving the load state from candidate base stations, as in step 521. In another embodiment, the load state may be checked by requesting/receiving the load state from a candidate base station in a timely manner (e.g., if it is necessary to check the load state of a subcell satisfying the channel state after the scanning report) (not illustrated in FIG. 5B).

In step 511, in consideration of the load states of the candidate subcells, the base station notifies available candidate subcells to the user terminal through a ranging response message.

In step 513, the user terminal transmits a scanning request (SCN_REQ) message to the base station.

In step 515, the base station transmits a scanning response message to the user terminal.

In step 517, through a scanning report (SCN_REP) message, the user terminal reports the scanning results for the candidate subcells whose load states are considered during the scanning period.

In step 519, after the ranging response, the base station separately transmits a base station handover request (BSHO-REQ) to forcibly perform a handover so that the user terminal can again perform an initial network entry, or a handover operation mode (mandatory or recommend) is added in the ranging response message so that the base station can initiate a handover (BS_init HO). After the ranging response, a step of transmitting a BSHO-REQ or adding a handover operation mode may be performed in FIG. 4 or FIG. 5A.

Thereafter, the load balancing process of the present invention is ended.

According to embodiments, if the user terminal beforehand notifies the scanning results of multiple candidate subcells to the base station for the ranging request by applying FIG. 4 as well as FIGS. 5A and 5B, the scanning values reported by the user terminal may be used to detect the loads of subcells with a channel state that does not cause a ping-pong effect.

Also, the band-based load detection results may be transmitted through the SLP in FIGS. 2 through 5, and subcells including a serving subcell may be represented respectively.

An operation of a base station for performing load balancing in the broadband communication system in the handover is similar to the operation of the base station for performing load balancing in the network reentry in FIGS. 4 and 5. Thus, a description will be given of only a difference between the cases of the network reentry and the handover.

In the case of the handover, the original serving subcell supporting the corresponding user terminal immediately before the HO-IND already performs the radio condition/load check with respect to BSIDs included in the MSHO-REQ, thereby making it possible to a target subcell receiving the RNG-REQ to utilize the results. For example, first, if a subcell receiving the RNG-REQ cannot support the corresponding user terminal, it can be acquired by requesting the original serving subcell. Second, the load check results may be transmitted together when the original serving subcell transmits the contents necessary for supporting the corresponding user terminal in the current target subcell.

If the subcell receiving the ranging request cannot support the corresponding user terminal, because the initial access fails and thus is in a null state, HO code ranging is attempted for an FA or subcell notified from the base station, or an initial access is attempted, or subcells in the NBR-ADV are randomly selected to attempt HO code ranging or an initial access. If the BSHO-REQ is set to 'mandatory', HO code ranging or an initial network entry may be performed without HO-IND. An operation scheme of the system and the user terminal is processed through one of the following.

a) The target subcell receiving the RNG-REQ reports this fact to the original serving subcell supporting the corresponding user terminal immediately before the HO-IND and performs ARQ reset. If it is not 'mandatory', i.e., if the base station notifies multiple available BSIDs, the user terminal may report a subcell, on which a handover is to be performed, to the base station through the HO-IND. If the serving subcell indicates 'mandatory HO', the corresponding user terminal moves to an FA or subcell indicated by the serving subcell, regardless of the HO-IND. For support of the corresponding user terminal, the original serving subcell transmits per-flow context (QoS profile) and traffic to a new target subcell, or the current target subcell receives all of them from the original serving subcell and transmits the same to a new target subcell.

b) The user terminal starts an initial network entry using an FA or subcell ID notified by the current target subcell. The current target subcell notifies this fact to the original serving subcell to release the IDs and radio resources of all the corresponding user terminals.

c) The current target subcell makes the corresponding user terminal an idle mode, and an anchor ASN_GW stores and manages information about the QoS parameter setting and per-flow mode state of the user terminal when it is present in the original serving subcell.

Figure 6:
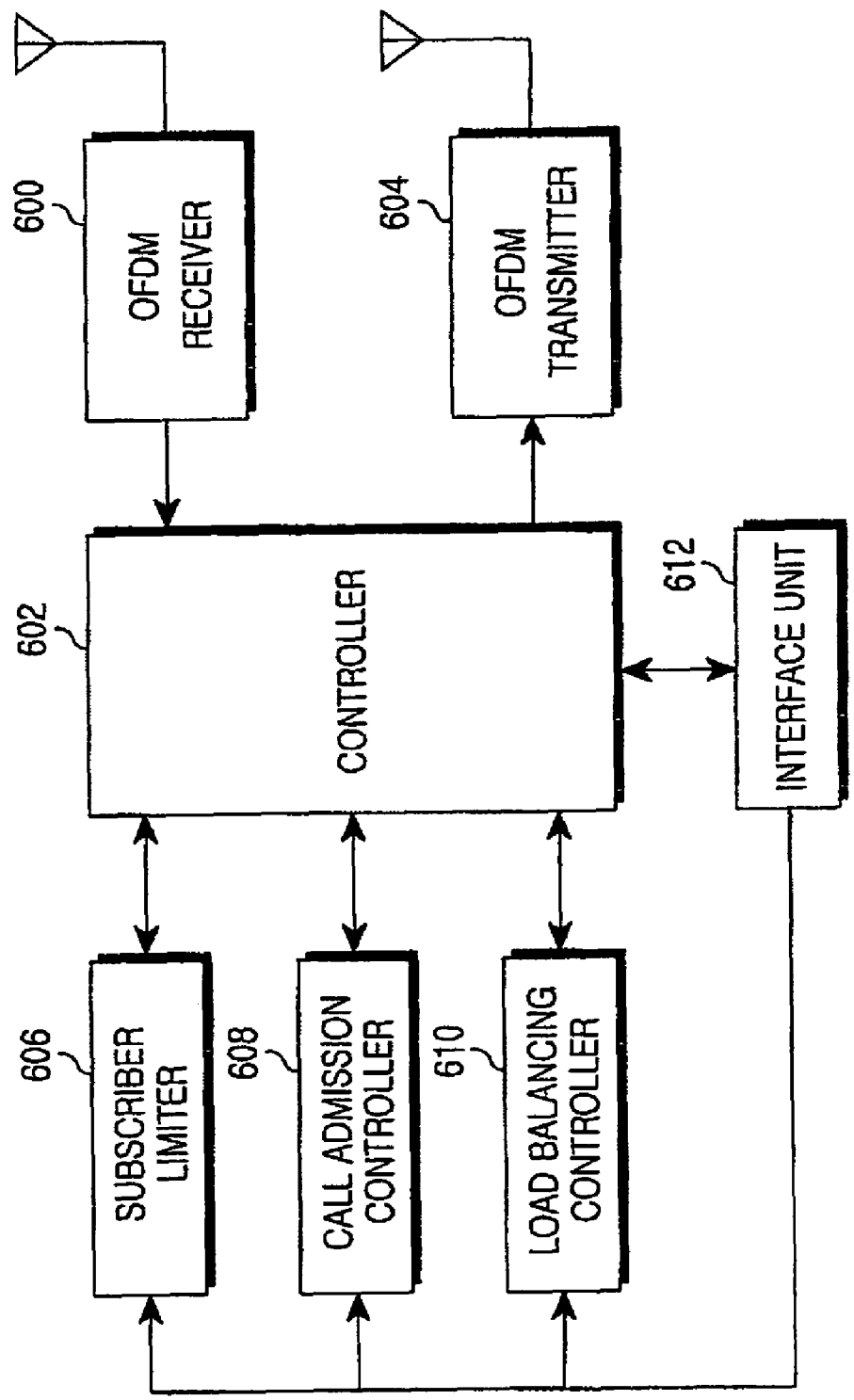
FIG. 6 is a block diagram of a base station apparatus for performing load balancing in a broadband communication system by the use of an admission control according to an embodiment of the present invention.

FIG. 6 is a block diagram of an apparatus for performing load balancing in a broadband communication system by the use of an admission control according to an embodiment of the present invention. For example, the apparatus illustrated in FIG. 6 may be implemented in a base station or a user terminal.

Referring to FIG. 6, the base station apparatus includes an OFDM receiver 600, a controller 602, an OFDM transmitter 604, an interface unit 612, a subscriber limiter 606, a call admission controller 608, and a load balancing controller 610.

The OFDM receiver 600 converts a radio frequency (RF) signal received through an antenna into a baseband analog signal. Also, the OFDM receiver 600 converts the analog signal into sample data, Fast Fourier Transform (FFT)—processes the sample data into frequency-domain data, and selects data of subcarriers to be received from the frequency-domain data. Also, the OFDM receiver 600 demodulates/decodes the selected data according to a predetermined modulation level (MCS level) and outputs the resulting data to the controller 602.

The controller 602 performs corresponding processes for data received from the OFDM receiver 600, and provides the results to the OFDM transmitter 604. Also, the controller 602 controls a ranging process, checks a channel state through the scanning, and checks a load state of a candidate FA or subcell. For example, the controller 602 transmits scanning response message for requesting the scanning of candidate subcells present in a Neighbor Advertisement (NBR-ADV) to a user terminal, receives a scanning report message for the scanning request, uses the scanning report results to check the load of a candidate FA or subcell satisfying a predetermined threshold value. According to embodiments, the controller 602 detects the load of a candidate FA or subcell present in a Neighbor Advertisement (NBR-ADV), notifies information about an available candidate FA or subcell satisfying a load threshold value through a ranging response message, and performs scanning of the available candidate FA or subcell satisfying the load threshold value.

For selection of the available candidate FA or subcell, in consideration of a radio channel state and a load state, the controller 602 selects an FA present in the same sector and selects an FA of another sector or a neighbor cell if there is no allowance of an FA in the same sector.

The OFDM transmitter 604 encodes/modulates data received from the controller 602 according to a predetermined modulation level (MCS level). Also, the OFDM transmitter 604 Inverse Fast Fourier Transform (IFFT)—processes the modulated data to output sample data (OFDM symbol). Also, the OFDM transmitter 604 converts the sample data into an analog signal, converts the analog signal into an RF signal, and transmits the RF signal through an antenna.

The subscriber limiter 606 performs a User Admission Control for subscriber number limit upon receipt of a ranging request message for a serving FA. For example, the subscriber limiter 606 checks a CPU load for the serving FA, and compares the same with a user allowable threshold value set differently depending on the user types to determine whether to admit a user.

If the subscriber number limit is not exceeded, the call admission controller 608 performs a Call Admission Control (CAC) for per-flow QoS. That is, the call admission controller 608 determines whether to admit a call for each flow preset in a network reentry or a handover.

According to the user admission control results, the load balancing controller 610 selects an available candidate FA and subcell ID and transmits the same through a ranging response message. Herein, the candidate FA selection for an Admission Control (AC) is determined according to the following order. An FA present in the same sector is selected, and an FA of a subcell or an FA of a neighbor cell included in an NBR-ADV or another sector is selected if there is no allowance in the same sector. Then, if 'abort' is set in an RNG-RSP and if another available FA is notified, an SLP value may be specified for another available FA as well as a subcell receiving an RNG-REQ and whether there is the same sector may also be notified. In the current standard, a TLV (Type/Length/Value) structure of an RNG-RSP is configured to allow only one FA. However, the present invention proposes that also a subcell ID (BSID) can be included therein. Multiple subcell IDs (BSIDs) with good radio channel conditions, determined by a user terminal, may be included in an RNG-REQ, which may be reflected to perform load balancing for selection of an FA by a base station.

After the connection admission control for the per-flow QoS, the load balancing controller 610 allocates Traffic Categories IDs (TCIDs) to only allowed SFs including an initial service flow (ISF) to enable the same, releases all of the non-allowed SFs by not performing CID update, or stores/manages the SFs set to static QoS among the non-allowed SFs in the system and the user terminal without a separate Dynamic Service Change (DSC) process, and specifies that the SFs set to dynamic QoS is capable of CID update without a separate DSD process (SLP=1). According to embodiments, after the connection admission control for the per-flow QoS, TCIDs are allocated to all the SFs, BS_init DREG (De/Re-register) is transmitted to make the user terminal an idle mode, or all the BSIDs in an NBR-ADV are selected as candidates to perform a BS handover request (BSHO-REQ).

Figure 7:
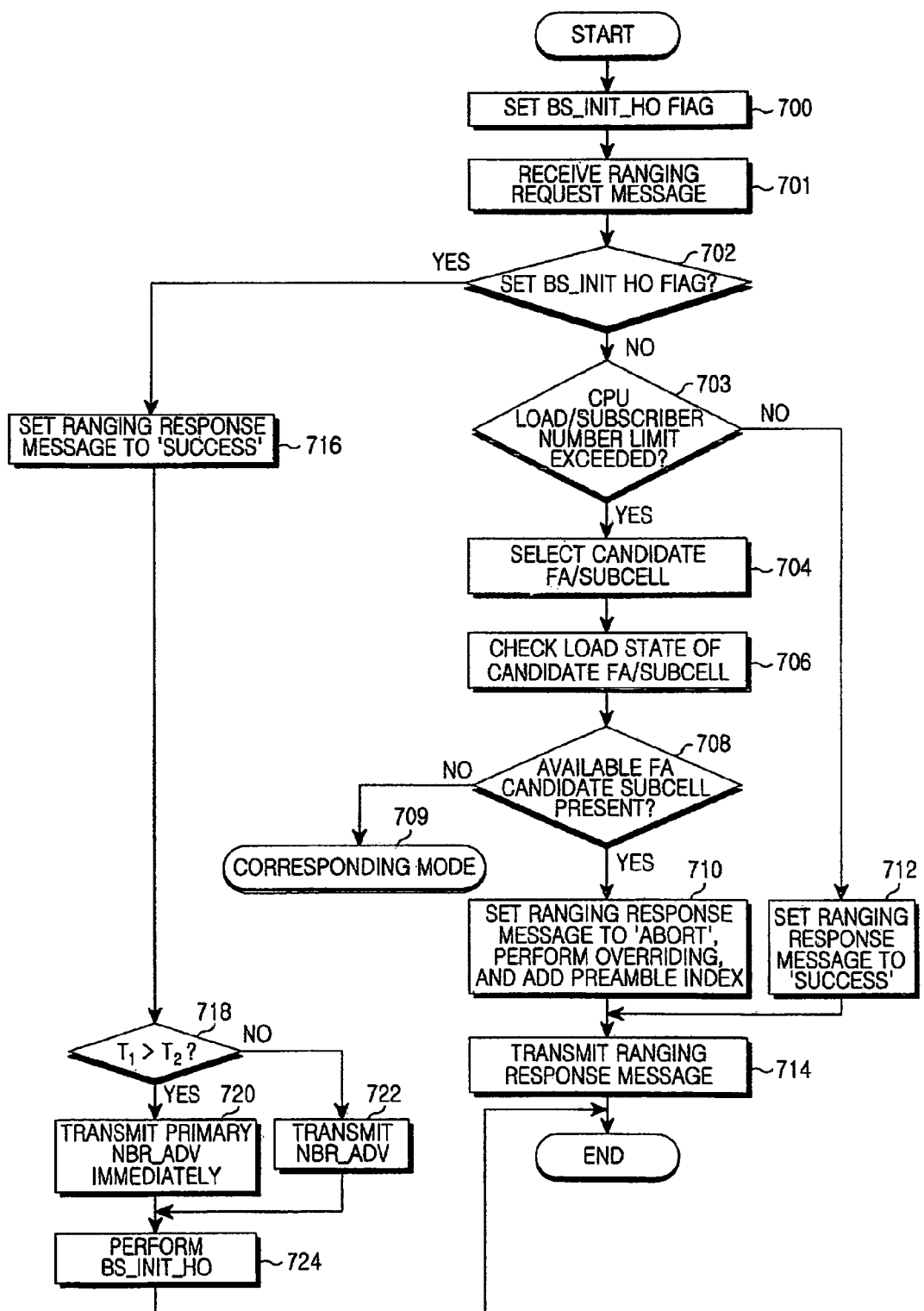
FIG. 7 is a flow diagram illustrating an operation of a base station for performing load balancing in a broadband communication system in an initial network entry without the use of channel state information according to another embodiment of the present invention.

FIG. 7 is a flow diagram illustrating an operation of a base station for performing load balancing in a broadband communication system in an initial network entry without the use of channel state information according to another embodiment of the present invention.

Referring to FIG. 7, in step 700, the base station decides the BS_init_HO flag value.

In step 701, a base station receives a ranging request message from a user terminal in an initial network entry.

In step 702, if the BS_init_HO flag is not set, the operation proceeds to step 703.

In step 703, in response to the ranging request, the base station performs a User Admission Control in consideration of an overload (CPU or memory)/subscriber number limit. Herein, the excess or not of the maximum allowable downlink/uplink SF number for each subscriber class per Access Service Network Gateway (ASN_GW), per base station (BS), per subcell, or per subscriber may also be a subscriber number limit check item. For the subscriber number limit depending on a CPU load, the CPU load may be classified into five levels of 'over load', 'heavy load', 'normal load', 'light load' and 'no load', and the allowable additional subscriber numbers for the respective CPU load levels may be respectively set to 0%, 10%, 50%, 70% and 100% of the maximum allowance.

If the CPU load/subscriber number limit for a ranging process is not exceeded (in step 702), the operation proceeds to step 712. In step 712, the base station sets a ranging state to 'success'.

On the other hand, if the CPU load/subscriber number limit for the ranging process is exceeded (in step 703), the operation proceeds to step 704. In step 704, the base station selects candidate FAs and subcells. Herein, for the selection of the candidate FAs (or subcells), FAs (or subcells) in the same sector are first selected and then FAs (or subcells) of other sectors or neighbor cells contained in a Neighbor Advertisement (MBR-ADV) message are selected if there is no allowance in the same sector.

If the user terminal is in the condition of a handover, the load balancing may be performed by selecting FAs (or subcells) in the same sector and selecting FAs (or subcells) of other sectors if FAs (or subcells) in the same sector are not allowed. However, if the user terminal is not in the condition of a handover (i.e., if the mobility of the user terminal is small) and if FAs (or subcells) in the same sector are not allowed, performing the load balancing by selection of FAs (or subcells) of other sectors may actually degrade the performance. The reason for this is that FAs (or subcells) of other sectors may be worse in radio channel state than FAs (or subcells) of the same sector, when the user terminal is not in the condition of a handover, although the FAs (or subcells) of other sectors are allowable. Thus, in this case, load balancing may be performed partially in the same sector, although all the FAs (or subcells) of the same sector are not allowed.

In step 706, the base station checks the load state of the selected candidate FA (or subcell). Herein, the load state of the candidate FA (or subcell) may be checked by periodically receiving information about the load state of the candidate FA (or subcell) from neighbor base stations (i.e., in a pull mode), or by timely requesting/receiving information about the load state of the candidate FA (or subcell) from neighbor base station (i.e., in a push mode).

In step 708, in consideration of the load state, the base station checks whether there is an available candidate FA (or subcell). If there is an available candidate FA (or subcell) (in step 708), the operation proceeds to step 710. In step 710, the base station sets the ranging state to 'abort' and overrides the available FA (or subcell), and adds a preamble index. Adding the preamble index is to designate a specific candidate subcell, because the overridden candidate FA includes multiple subcells.

In step 714, the base station transmits a ranging response message containing information about the ranging state and the available FA (or subcell ID). Herein, if 'abort' is set in the ranging response message and another available FA is notified, an SLP value may be specified about another available FA (or subcell) as well as the subcell that received the ranging message and whether there is the same sector may also be notified. In the current standard, a TLV (Type/Length/Value) structure of a ranging message is configured to allow only one FA. However, the present invention proposes that multiple FAs or one or more subcell IDs (BSIDs) can be included therein. The handover operation mode is useful when a target subcell or a FA is present in the same sector or radio conditions are similar.

In still another case, if the ranging sate is 'abort' and there is no available FA (or subcell ID), it may be partially allowed. Also, if the ranging state is 'success', the base station and the user terminal maintain and use a current serving FA or subcell ID.

As described above, if there is no available FA due to the CPU load/subscriber number limit (i.e., if the current FA must be used), the ranging state is set to 'abort', i.e., the current FA is used as it is and a preamble index of an available subcell is added, thereby performing a load balancing process. In another embodiment, if there is no available subcell due to the CPU load/subscriber number limit (i.e., the current FA must be used) and if there is an available subcell, a BS_init_HO (a handover request from a base station) function may be used to perform the load balancing.

That is, if there is no available candidate FA (in step 708), the base station progresses a correspond mode in step 709.

On the other hand, if the BS_init_HO flag is set, the operation proceeds to step 716. In step 716, the base station sets a ranging state to 'success'.

In step 718, the base station compares an NBR_ADV message transmission time T1 with a threshold value T2. If the NBR_ADV message transmission time T1 is greater than the threshold value T2 (in step 718), the operation proceeds to step 720. In step 720, the base station transmits a primary NBR_ADV message immediately. If the NBR_ADV message transmission time T1 is smaller than the threshold value T2 (in step 718), the base station transmits an NBR_ADV message after waiting until the NBR_ADV transmission time in step 722.

In step 724, the base station performs BS_init_HO using the received NBR_ADV message.

Because the place to which the user terminal moves cannot be detected using only a subcell ID in the BS_init HO message, the BS_init HO is performed after receiving an NBR_ADV message including a subcell ID and a preamble index. In order to prevent the BS_init HO from being performed before the NBR_ADV message transmission time, the corresponding subcell broadcasts a temporary primary NBR_ADV message at the BS_init HO time. However, broadcasting a primary NBR_ADV for a specific user terminal needs to allocate a separate radio resource. A solution scheme without broadcasting the primary NBR_ADV is to transmit the BS_init HO after the NBR_ADV. However, because the NBR_ADV is transmitted at intervals of two (2) seconds to five (5) seconds, the BS_init HO process is delayed to degrade the total performance.

To this end, if the user terminal moves to a new subcell and thus is overridden, and if (the NBR_ADV message transmission time–the current time) is greater than a threshold value (e.g., 500 ms), the primary NBR_ADV is transmitted immediately and the BS_init HO is performed. If the NBR_ADV message transmission time–the current time is less than a threshold value (e.g., 500 ms), the primary NBR_ADV is not transmitted and the BS_init HO is performed immediately after the NBR_ADV transmission after waiting until the NBR_ADV message transmission.

Thereafter, the load balancing process of the present invention is ended.

As described above, only FA information can be notified through the ranging response message. However, according to another embodiment, if other available FAs are transmitted, a preamble index is also transmitted in order to easily check to which subcell the user terminal corresponds. Also, it is fundamental that scanning about candidate FAs in the same sector is not performed and, although present in different sectors, other available FAs (together with a preamble index) or subcells are transmitted without additional scanning and one of available subcells is selected to perform a load balancing control. However, if scanning is performed in advance, because not all the subcells in a neighbor base station list of the NBR-ADV message but only the best few FAs or subcells can be transmitted through the ranging response message, the size of the ranging response message can be reduced to reduce a waste of radio resources.

According to still another embodiment, as a method for performing load balancing in an initial network entry, if a BS_init HO function (a handover request from a base station) is enabled together with an FA overriding function (a function for overriding an FA through a ranging response message), it operates as follows. In the process of performing the user admission control in step 702, if the CPU load/subscriber number limit is exceeded, the operation proceeds directly to step 716, so that the BS_init HO function may be performed for the load balancing process. Herein, available candidate subcells are transmitted while the HO operation mode is set to 'mandatory'.

Figure 8:
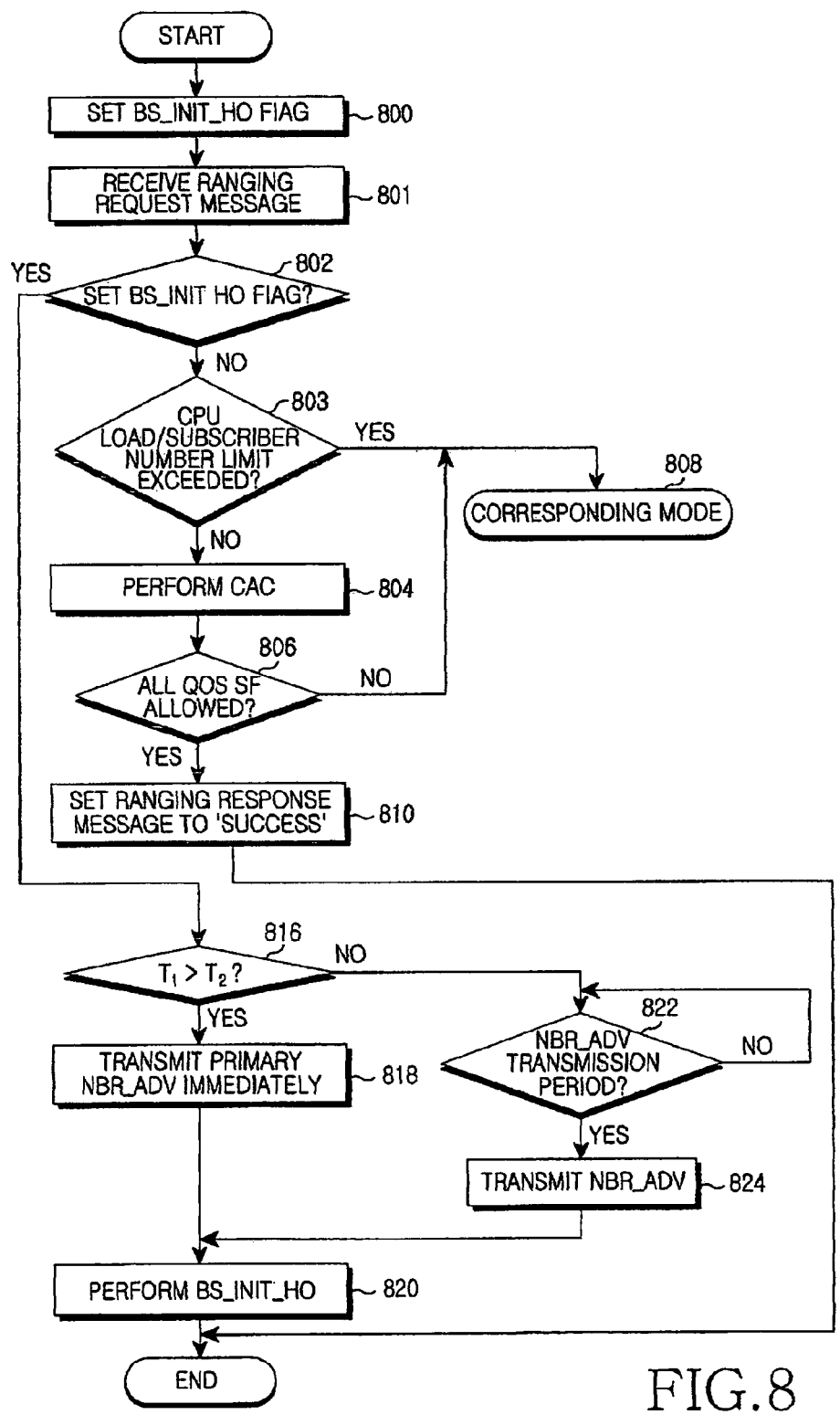
FIG. 8 is a flow diagram illustrating an operation of a base station for performing load balancing in a broadband communication system in a network entry or handover without the use of channel state information according to an embodiment of the present invention.

FIG. 8 is a flow diagram illustrating an operation of a base station for performing load balancing in a broadband communication system in a network entry or handover without the use of channel state information according to an embodiment of the present invention.

Referring to FIG. 8, in step 800, the base station decides the BS_init_HO flag value.

In step 801, a base station receives a ranging request message from a user terminal in a network reentry or a handover.

In step 802, the BS_init_HO flag is not set, the operation proceeds to step 803.

In step 803, in response to the ranging request, the base station performs a user admission control of FIG. 7 to detect the CPU load/subscriber number limit.

If the subscriber number limit for a ranging process is not exceeded (in step 803), the operation proceeds to step 804. In step 804, the base station performs a Connection Admission Control (CAC) for per-flow QoS. In step 806, the base station determines whether all QoS SFs are allowed. If all QoS SFs are allowed (in step 806), the operation proceeds to step 810. In step 810, the base station sets a ranging state to 'success'. On the other hand, if the subscriber number limit for a ranging process is not exceeded (in step 802) or if all QoS SFs are not allowed (in step 806), the base station progresses a correspond mode in step 808.

On the other hand, if the BS_init_HO flag is set (in step 802), the operation proceeds to step 816. In step 816, the base station compares an NBR_ADV message transmission time T1 with a threshold value T2 after setting a ranging state to 'success'. If the NBR_ADV message transmission time T1 is greater than the threshold value T2 (in step 816), the operation proceeds to step 818. In step 818, the base station transmits a primary NBR_ADV message immediately. If the NBR_ADV message transmission time T1 is smaller than the threshold value T2 (in step 816), the base station checks the NBR_ADV message transmission time in step 822 and transmits an NBR_ADV message in step 824.

In step 820, the base station performs BS_init_HO.

Because the place to which the user terminal moves cannot be detected using only a subcell ID present in the BS_init HO message, the BS_init HO is performed after receiving an NBR_ADV message including a subcell ID and a preamble index.

Thereafter, the load balancing process of the present invention is ended.

Figure 9:
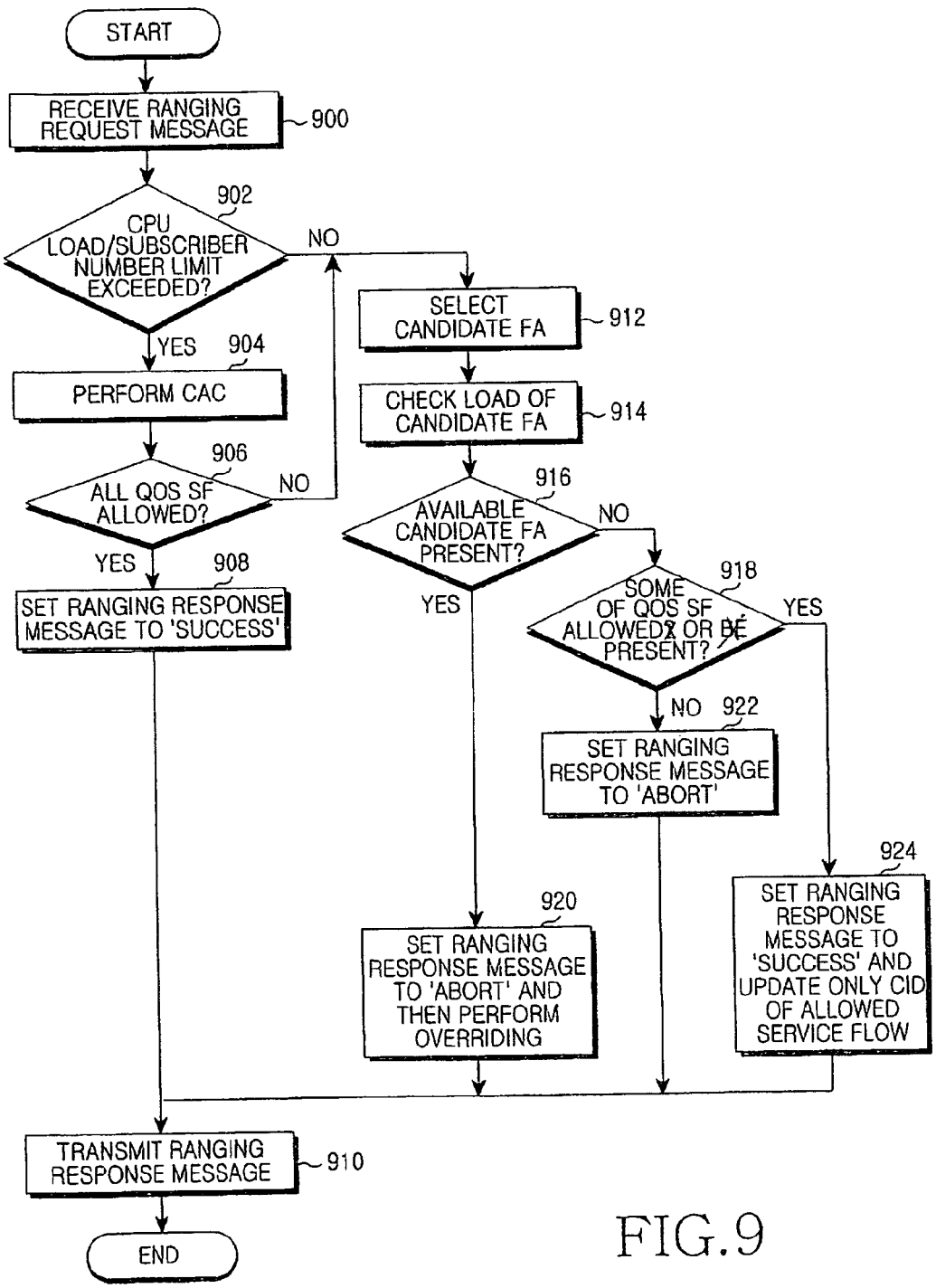
FIG. 9 is a flow diagram illustrating an operation of a base station for performing load balancing in a broadband communication system in a network entry or handover without the use of channel state information according to another embodiment of the present invention.

FIG. 9 is a flow diagram illustrating an operation of a base station for performing load balancing in a broadband communication system in a network entry or handover without the use of channel state information according to another embodiment of the present invention.

Referring to FIG. 9, in step 900, a base station receives a ranging request message from a user terminal in a network reentry or handover.

In step 902, in response to the ranging request, the base station performs the user admission control of FIG. 7 to check the CPU load/subscriber number limit.

If the subscriber number limit for a ranging process is exceeded (in step 902), the operation proceeds to step 904. In step 904, the base station performs a Connection Admission Control (CAC) for per-flow QoS. In step 906, the base station determines whether all QoS SFs are allowed. If all QoS SFs are allowed (in step 906), the base station sets a ranging state to 'success' in step 908 and transmits a ranging response message in step 910.

On the other hand, if the CPU load/subscriber number limit for the ranging process is not exceeded (in step 902) or if all the QoS SFs are not allowed (in step 906), the operation proceeds to step 912. In step 912, the base station selects candidate FAs (or subcells). Herein, for the selection of the candidate FAs (or subcells), FAs in the same sector are first selected and then FAs (or subcells) of other sectors or neighbor cells contained in a Neighbor Advertisement (MBR-ADV) message are selected if there is no allowance in the same sector.

If the user terminal is in the condition of a handover, the load balancing may be performed by selecting FAs (or subcells) in the same sector and selecting FAs (or subcells) of other sectors if FAs (or subcells) in the same sector are not allowed. However, if the user terminal is not in the condition of a handover (i.e., if the mobility of the user terminal is small) and if FAs (or subcells) in the same sector are not allowed, performing the load balancing by selection of FAs (or subcells) of other sectors may actually degrade the performance. The reason for this is that FAs (or subcells) of other sectors may be worse in radio channel state than FAs (or subcells) of the same sector, when the user terminal is not in the condition of a handover, although the FAs (or subcells) of other sectors are allowable. Thus, in this case, partial load balancing may be performed in the same sector, although all the FAs (or subcells) of the same sector are not allowed.

In step 914, the base station checks the load state of a candidate FA (or subcell). Herein, the load state of the candidate FA (or subcell) may be checked by periodically receiving information about the load state of the candidate FA (or subcell) (i.e., in a pull mode), or by timely requesting/receiving information about the load state of the candidate FA (or subcell) (i.e., in a push mode).

In step 916, considering the load state, the base station checks whether there is an available candidate FA (or subcell). If there is an available candidate FA (or subcell) (in step 916), the operation proceeds to step 920. In step 920, the base station sets a ranging response message to 'abort', overrides the corresponding FA, and adds a preamble index. In step 910, the base station transmits a ranging response message.

If there is no available candidate FA (or subcell) (in step 916), the operation proceeds to step 918. In step 918, based on the bandwidth of a serving subcell, the base station checks whether QoS SFs are partially allowed. If the QoS SFs are not partially allowed (in step 918), the base station sets a ranging message to 'abort' in step 922 and transmits a ranging response message in step 910.

If the QoS SFs are partially allowed (in step 918), the operation proceeds to step 924. In step 924, the base station sets the ranging state to 'success' and updates only a connection ID (CID) of only an allowed SF. Although not allowed, SFs generated by static or semi-dynamic QoS setup are automatically provisioned/managed without a separate Dynamic Service Change (DSC) process or a CID is not allocated. SFs set to static QoS are released by the system and the user terminal without a separate Dynamic Service Deletion (DSD) process.

Thereafter, the load balancing process of the present invention is ended.

Figure 10A:
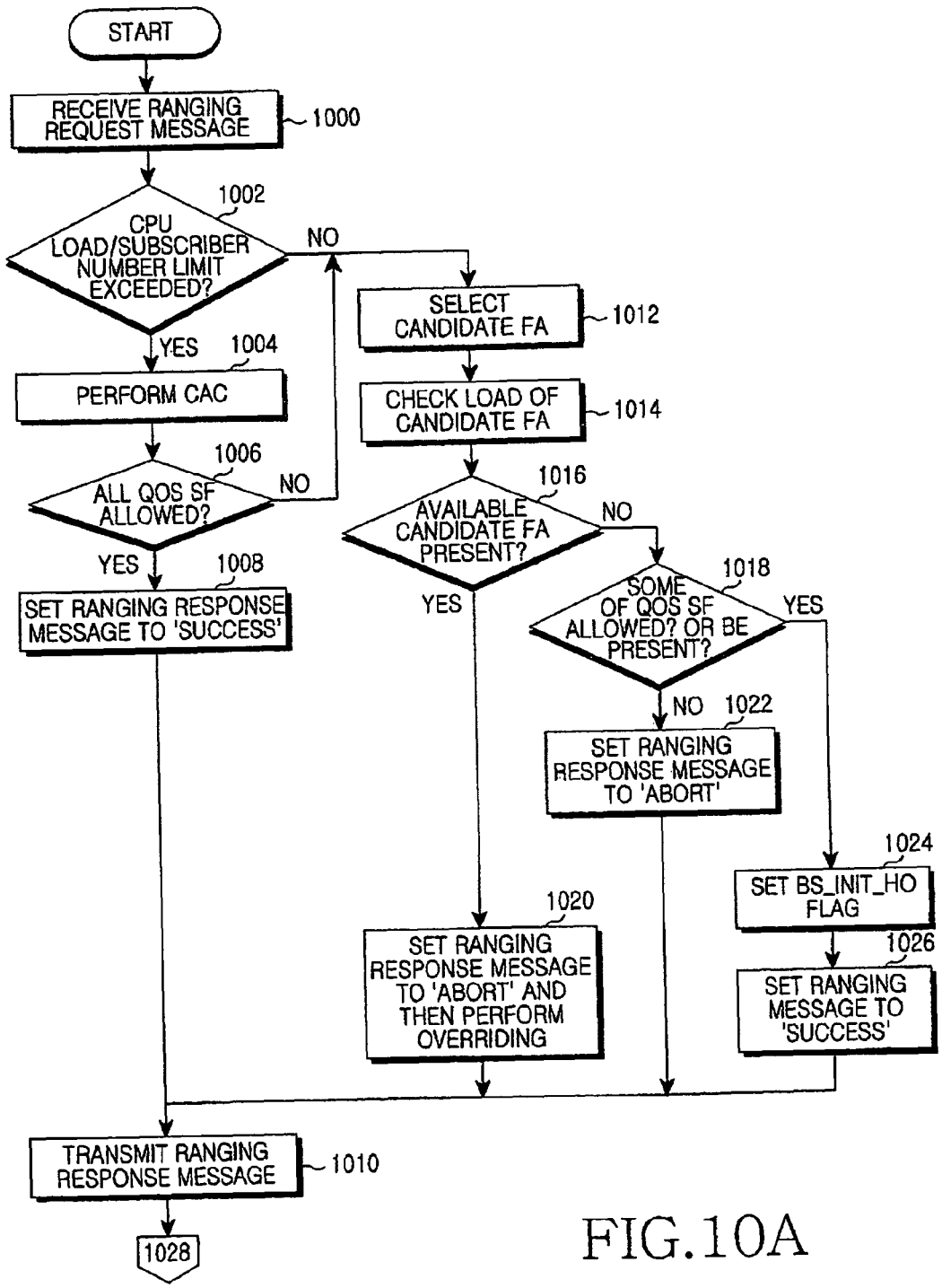
FIGS. 10A and 10B are a flow diagram illustrating an operation of a base station for performing load balancing in a broadband communication system in a network entry or handover without the use of channel state information according to still another embodiment of the present invention.
Figure 10B:
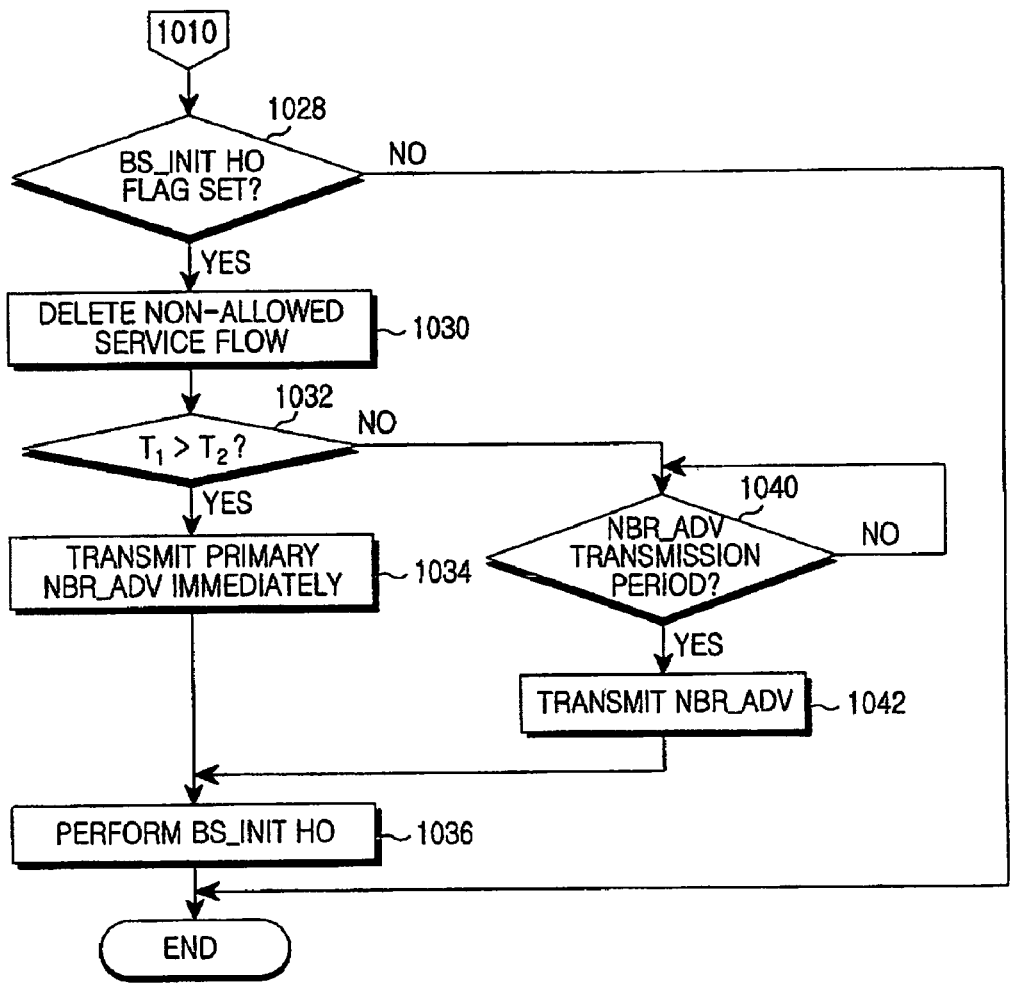

FIG. 10 is a flow diagram illustrating an operation of a base station for performing load balancing in a broadband communication system in a network entry or handover without the use of channel state information according to still another embodiment of the present invention.

Referring to FIG. 10, steps 1000 to 1022 are identical to those of the load balancing process of FIG. 9, and thus their detailed description will be omitted for conciseness.

That is, if a serving subcell allows some SFs including initial SFs, FIG. 9 sets the ranging response to 'success' and performs CID update for only allowed SFs. Although not allowed, SFs generated by static or semi-dynamic QoS setup are provisioned/managed or deleted by not allocating CIDs thereto.

In FIG. 10, if a serving subcell allows some SFs including initial SFs in step 1018, the base station sets a BS_init_HO flag in order to be able to request a handover, in step 1024.

After setting the ranging message to 'success' in step 1026, the base station transmits a ranging response message in step 1010.

In step 1028, the base station checks whether a BS_init_HO flag is set. If the BS_init_HO flag is not set, the load balancing process is ended.

On the other hand, if the BS_init_HO flag is set, the base station deletes non-allowed service flows in step 1030. In step 1032, the base station compares an NBR_ADV message transmission time T1 with a threshold value T2. If the NBR_ADV message transmission time T1 is greater than the threshold value T2 (in step 1032), the operation proceeds to step 1034. In step 1034, the base station transmits a primary NBR_ADV message immediately. If the NBR_ADV message transmission time T1 is smaller than the threshold value T2 (in step 1032), the operation proceeds to step 1040. In step 1040, the base station checks whether it is the NBR_ADV message transmission time and transmits an NBR_ADV message in step 1042.

In step 1036, the base station performs BS_init_HO using the received NBR_ADV message.

Because the place to which the user terminal moves cannot be detected using only a subcell ID present in the BS_init HO message, the BS_init HO is performed after receiving an NBR_ADV message including a subcell ID and a preamble index.

Thereafter, the load balancing process of the present invention is ended.

As described above, the present invention provides the scheme for distributing given radio resources to multiple user terminals in a balanced manner when one or more subcells (1FA/1sector) are managed in the broadband communication system, thereby making it possible to maximize the use of radio interfaces. According to another embodiment, when the base station transmits MSHO_RSP or BSHO_REQ message, sends only allowable BSID without high load.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operation method of a base station (BS) for performing load balancing in a broadband communication system in an initial network entry, the method comprising:
   receiving a ranging request message from a user terminal;
   determining, upon receipt of the ranging request message, whether to allow the user terminal by taking into account a network load;
   setting a ranging status to 'abort', if the user terminal is not allowed;
   generating a first ranging response message including the ranging status which is set to 'abort' and at least one of a frequency override for a channel on which the user terminal redoes ranging and preamble index override for a preamble index of a target BS where the user terminal redoes ranging;
   transmitting the first ranging response message to the user terminal in response to the ranging request message; and
   setting a ranging status to 'success' if the user terminal is allowed, generating a second ranging response message to the user terminal in response to the ranging request message including the ranging status which is set to 'success', without the frequency override and the preamble index override and transmitting the second ranging response message to the user terminal in response to the ranging request message,
   wherein when the preamble index override is used with the frequency override, redoing ranging is performed on a downlink channel identified by the preamble index of the target BS.

2. The method of claim 1, wherein the frequency override comprises a center frequency of downlink channel where the user terminal redoes ranging.

3. The method of claim 1, wherein if the preamble index override includes two or more preamble indices for target BSs, the preamble indices are arranged in order of preference.

4. The method of claim 1, wherein the broadband communication system is an OFDM or OFDMA system.

5. The method of claim 1, wherein the ranging response message further includes a service level prediction (SLP) value associated with the preamble index of the target BS.

6. The method of claim 1, further comprising:
   checking a channel state of neighbor base stations;
   checking a load of at least one first neighbor base station satisfying a predetermined threshold for the channel state among the neighbor base stations; and
   identifying at least one second neighbor base station satisfying a load threshold among the at least one first neighbor base station.

7. A method for performing load balancing in a broadband communication system in an initial network entry, the method comprising:
   receiving a ranging request message from a user terminal in the initial network entry;
   upon receipt of the ranging request message, determining whether to allow the user terminal by checking whether a predetermined limit is exceeded;
   setting a base station-initiated handover flag (BS_init HO flag) and completing a network entry after allowing the user terminal;
   checking the base station-initiated handover flag (BS_init HO flag);
   checking a transmission time of a NBR_ADV (NeighBoR ADVertisement) message including available frequency assignments or subcells if the base station-initiated handover flag (BS_init HO flag) is set, immediately transmitting a first NBR_ADV message if the NBR_ADV transmission time is greater than a threshold value, and transmitting a second NBR_ADV message at the transmission time if the NBR_ADV transmission time is smaller than the threshold value; and
   performing a handover process to one of available subcells after completion of the network entry.

8. A method for performing load balancing in a broadband communication system in a network reentry/handover, the method comprising:
   performing, upon receipt of a ranging request, an admission control with respect to an available user terminal and determining whether to allow service flows;
   checking a load of a candidate frequency assignment (FA) or subcell if all the service flows of the user terminal are not allowed;
   setting a ranging status according to whether the candidate frequency assignment or the subcell is available and whether to allow a part of the service flows, and overriding an available candidate frequency assignment or a preamble index of an available candidate subcells in a ranging response message, when the user terminal is not allowed during the admission control; and
   transmitting the ranging response message to the user terminal,
   wherein if the candidate frequency assignments or subcells are unavailable and a partial service flow of the user terminal is allowed, a ranging status is set to 'success', connection IDs (CIDs) are updated for only the allowed service flows, the service flows set to a static quality of service (QoS) among the non-allowed service flows are managed without a separate dynamic service change (DSC) process, and the service flows set to a dynamic quality of service are released without a separate dynamic service deletion (DSD) process.

9. The method of claim 8, further comprising receiving the load of the candidate frequency assignment or subcell in a periodic or timely manner.

10. The method of claim 8, wherein checking a load of the candidate frequency assignment or subcell comprises:
    transmitting a scanning response message for requesting the scanning of all the frequency assignments or subcells to the user terminal;
    receiving a scanning report message from the user terminal in response to the scanning request; and
    selecting candidate frequency assignments or subcells according to the scanning report results to detect the load.

11. The method of claim 10, wherein overriding the candidate frequency assignment or subcell comprises overriding a frequency assignment present in the same sector and overriding a frequency assignment of a neighbor cell or another sector if there is no allowance of a frequency assignment in the same sector.

12. The method of claim 8, wherein checking a load of the candidate frequency assignment or subcell comprises:
   selecting and notifying an available candidate frequency assignment or subcell taking into consideration the load; and
   performing a scanning process for the available selected candidate frequency assignment or subcell.

13. The method of claim 8, wherein the ranging response message includes a service level prediction (SLP) value specified for the available candidate frequency assignment or subcell and an information notifying whether the available candidate frequency assignment or subcell is present in the same sector.

14. The method of claim 8, further comprising if the candidate frequency assignments or subcells are unavailable and a partial service flow of the user terminal is allowed:
   setting a base station-initiated handover flag (BS_init Handover flag) and transmitting a ranging response message;
   checking the base station-initiated handover flag (BS_init Handover flag);
   checking a transmission time of a NBR_ADV (NeighBoR ADVertisement) message including available frequency assignments and subcells if the base station-initiated handover flag (BS_init Handover flag) is set, immediately transmitting a first NBR_ADV message if the NBR_ADV transmission time is greater than a threshold value, and transmitting a second NBR_ADV message at the transmission time if the NBR_ADV transmission time is smaller than the threshold value; and
   performing a handover process using the first NBR-ADV message or the second NBR_ADV message.

15. The method of claim 8, wherein if the candidate frequency assignment or subcell is available, a ranging status is set to 'abort' and an available candidate frequency assignment or subcell is overridden to transmit a ranging response message.

16. The method of claim 8, wherein if the candidate frequency assignments or subcells are unavailable and all the service flows of the user terminal are not allowable, a ranging status is set to 'abort' to transmit a ranging response message.

17. The method of claim 8, wherein if all the service flows of the user terminal are allowable, a ranging status is set to 'success' to transmit a ranging response message.

18. An apparatus for performing load balancing in a broadband communication system in an initial network entry, the apparatus comprising:
   a OFDM receiver configured to receive a ranging request message from a user terminal;
   a subscriber limiter configured to determine, upon receipt of the ranging request message, whether to allow the user terminal by taking into account a network load;
   a load balancing controller configured to:
      set a ranging status to 'abort', if the user terminal is not allowed, and generate a first ranging response message including the ranging status which is set to 'abort' and at least one of a frequency override for a channel on which the user terminal redoes ranging and preamble index override for a preamble index of a target base station (BS) where the user terminal redoes ranging; and
      set a ranging status to 'success' if the user terminal is allowed and generate a second ranging response message to the user terminal in response to the ranging request message including the ranging status which is set to 'success', without the frequency override and the preamble index override; and
   an OFDM transmitter configured to transmit one of the first and second ranging response messages to the user terminal in response to the ranging request message,
   wherein when the preamble index override is used with the frequency override, redoing ranging is performed on a downlink channel identified by the preamble index of the target BS.

19. The apparatus of claim 18, wherein the frequency override comprises a center frequency of downlink channel where the user terminal redoes ranging.

20. The apparatus of claim 18, wherein if the preamble index override includes two or more preamble indices for target BSs, the preamble indices are arranged in order of preference.

21. The apparatus of claim 18, wherein the broadband communication system is an OFDM or OFDMA system.

22. The apparatus of claim 18, wherein the ranging response message further includes a service level prediction (SLP) value associated with the preamble index of the target BS.

23. The apparatus of claim 18, further comprising:
   a controller configured to check a channel state of neighbor base stations, check a load of at least one first neighbor base station satisfying a predetermined threshold for the channel state among the neighbor base stations, and identify at least one second neighbor base station satisfying a load threshold among the at least one first neighbor base station.

24. An apparatus for performing load balancing in a broadband communication system in an initial network entry, the apparatus comprising:
   a controller configured to:
      receive a ranging request message from a user terminal in the initial network entry;
      upon receipt of the ranging request message, determine whether to allow the user terminal by checking whether a predetermined limit is exceeded;
      set a base station-initiated handover flag (BS_init HO flag) and complete a network entry after allowing the user terminal;
      check the base station-initiated handover flag (BS_init Handover flag);
      check a transmission time of a NBR_ADV (NeighBoR ADVertisement) message including available frequency assignments or subcells if the base station-initiated handover flag (BS_init HO flag) is set, immediately transmit a first NBR_ADV message if the NBR_ADV transmission time is greater than a threshold value, and transmit a second NBR_ADV message at the transmission time if the NBR_ADV transmission time is smaller than the threshold value; and
      perform a handover process to one of available subcells after completion of the network entry.

25. An apparatus for performing load balancing in a broadband communication system in a network reentry/handover, the apparatus comprising:
   a connection admission controller configured to perform, upon receipt of a ranging request, an admission control for each flow with respect to an available user terminal and determine whether to allow service flows;

a load balancing controller configured to check a load of a candidate frequency assignment (FA) or subcells if all the service flows of the user terminal are not allowed; and a controller configured to set a ranging status according to whether the candidate frequency assignment or the subcell is available and whether to allow a part of the service flows, and override the available candidate frequency assignment or a preamble index of an available candidate subcell in a ranging response message, when the user terminal is not allowed during the admission control, wherein the controller is further configured to transmit the ranging response message to the user terminal, and wherein if the candidate frequency assignment or subcell is unavailable and a partial service flow of the user terminal is allowed, the controller is further configured to set a ranging status to 'success', update connection IDs (CIDs) for only the allowed service flows, manage the service flows set to a static quality of service (QoS) among the non-allowed service flows without a separate dynamic service change (DSC) process, and release the service flows set to a dynamic quality of service without a separate dynamic service deletion (DSD) process.

26. The apparatus of claim 25, wherein the controller receives the load of the candidate frequency assignment or subcell in a periodic or timely manner.

27. The apparatus of claim 25, wherein the load balancing controller:
transmits a scanning response message for requesting the scanning of all the frequency assignments or subcells to the user terminal;
receives a scanning report message from the user terminal in response to the scanning request; and
selects candidate frequency assignments or subcells according to the scanning report results to detect the load.

28. The apparatus of claim 27, wherein selecting the candidate frequency assignments or subcells comprises selecting a frequency assignment present in the same sector and selecting a frequency assignment of a neighbor cell or another sector if there is no allowance of a frequency assignment in the same sector.

29. The apparatus of claim 25, wherein the controller overrides a candidate frequency assignment or subcell taking into consideration the load, and performs a scanning process for the selected candidate frequency assignment or subcell.

30. The apparatus of claim 25, wherein the ranging response message includes a service level prediction (SLP) value is specified for the available candidate frequency assignment or subcell and an information notifying whether the available candidate frequency assignment or subcell is present in the same sector.

31. The apparatus of claim 25, wherein if the candidate frequency assignment or subcells are unavailable and a partial service flow of the user terminal is allowed, the controller:
sets a base station-initiated handover flag (BS_init Handover flag) and transmits a ranging response message;
detects the base station-initiated handover flag (BS_init Handover flag);
detects a transmission time of a NBR_ADV (NeighBoR ADVertisement) message including available frequency assignments and subcells if the base station-initiated handover flag (BS_init Handover flag) is set, immediately transmits a first NBR_ADV message if the NBR_ADV transmission time is greater than a threshold value, and transmits a second NBR_ADV message at the transmission time if the NBR_ADV transmission time is smaller than the threshold value; and
performs a handover process using the first NBR-ADV message or the second NBR_ADV message.

32. The apparatus of claim 25, wherein if the candidate frequency assignment or subcells are available, the controller sets a ranging status to 'abort' and overrides an available candidate frequency assignment or subcell to transmit a ranging response message.

33. The apparatus of claim 25, wherein if the candidate frequency assignments or subcells are unavailable and all the service flows of the user terminal are not allowable, the controller sets a ranging status to 'abort' to transmit a ranging response message.

34. The apparatus of claim 25, wherein if all the service flows of the user terminal are allowable, the controller sets a ranging status to 'success' to transmit a ranging response message.

35. An operation method of a user terminal for performing load balancing in a broadband communication system in an initial network entry, the method comprising:
transmitting a ranging request message to a base station (BS) during the initial network entry;
receiving a ranging response message including one of:
a ranging status which is set to 'abort' and at least one of a frequency override for a channel on which the user terminal redoes ranging and preamble index override for a preamble index of a target BS where the user terminal redoes ranging, and
the ranging status which is set to 'success', without the frequency override and the preamble index override; and
redoing ranging using the frequency override for a channel on which the user terminal redoes ranging and the preamble index override for a preamble index of a target BS where the user terminal redoes ranging,
wherein when the preamble index override is used with the frequency override, redoing ranging is performed on a downlink channel identified by the preamble index of the target BS.

36. The method of claim 35, wherein the frequency override comprises a center frequency of downlink channel where the user terminal redoes ranging.

37. The method of claim 35, wherein if the preamble index override includes two or more preamble indices for target BSs, the preamble indices are arranged in order of preference.

38. The method of claim 35, wherein the broadband communication system is an OFDM or OFDMA system.

39. The method of claim 35, wherein the ranging response message further includes a service level prediction (SLP) value associated with the preamble index of the target BS.

40. An apparatus for performing load balancing in a broadband communication system in an initial network entry, the apparatus comprising:
an OFDM transmitter configured to transmit a ranging request message to a base station (BS) during the initial network entry,
an OFDM receiver configured to receive a ranging response message including one of:
a ranging status which is set to 'abort' and at least one of a frequency override for a channel on which the user terminal redoes ranging and preamble index override for a preamble index of a target base station (BS) where the user terminal redoes ranging, and
the ranging status which is set to 'success', without the frequency override and the preamble index override; and a controller configured to redo ranging using the frequency override for a channel on which the user terminal redoes ranging and the preamble index override for a preamble index of a target BS where the user terminal redoes ranging,
wherein when the preamble index override is used with the frequency override, redoing ranging is performed on a downlink channel identified by the preamble index of the target BS.

41. The apparatus of claim 40, wherein the frequency override comprises a center frequency of downlink channel where the user terminal redoes ranging.

42. The apparatus of claim 40, wherein if the preamble index override includes two or more preamble indices for target BSs, the preamble indices are arranged in order of preference.

43. The apparatus of claim 40, wherein the broadband communication system is an OFDM or OFDMA system.

44. The apparatus of claim 40, wherein the ranging response message further includes a service level prediction (SLP) value associated with the preamble index of the target BS.

* * * * *